US012730504B2

(12) United States Patent
Enoki et al.

(10) Patent No.: US 12,730,504 B2
(45) Date of Patent: Sep. 8, 2026

(54) IMAGE PROCESSING APPARATUS, IMAGE PROCESSING METHOD, AND OPERATION MICROSCOPE SYSTEM

(71) Applicants: Sony Group Corporation, Tokyo (JP); Sony Olympus Medical Solutions Inc., Tokyo (JP)

(72) Inventors: Junichiro Enoki, Tokyo (JP); Izumu Hosoi, Tokyo (JP); Yuki Sugie, Tokyo (JP); Tomoyuki Ootsuki, Tokyo (JP); Koji Kashima, Tokyo (JP); Hiroshi Ushiroda, Tokyo (JP); Koji Fukaya, Tokyo (JP)

(73) Assignees: Sony Group Corporation, Tokyo (JP); Sony Olympus Medical Solutions Inc., Tokyo (JP)

( * ) Notice: Subject to any disclaimer, the term of this patent is extended or adjusted under 35 U.S.C. 154(b) by 246 days.

(21) Appl. No.: 18/264,761

(22) PCT Filed: Jan. 28, 2022

(86) PCT No.: PCT/JP2022/003203
§ 371 (c)(1),
(2) Date: Aug. 9, 2023

(87) PCT Pub. No.: WO2022/181194
PCT Pub. Date: Sep. 1, 2022

(65) Prior Publication Data

US 2024/0045497 A1 Feb. 8, 2024

(30) Foreign Application Priority Data

Feb. 26, 2021 (JP) ................................ 2021-031261

(51) Int. Cl.
*G06F 3/01* (2006.01)
*G06T 3/40* (2006.01)
(Continued)

(52) U.S. Cl.
CPC ................ *G06F 3/013* (2013.01); *G06T 3/40* (2013.01); *G06T 7/50* (2017.01); *G06T 7/62* (2017.01);
(Continued)

(58) Field of Classification Search
None
See application file for complete search history.

(56) References Cited

U.S. PATENT DOCUMENTS

2011/0230751 A1* 9/2011 Kersting ............. A61B 3/0025 600/407
2016/0234488 A1* 8/2016 Zhao ................... H04N 13/398
(Continued)

FOREIGN PATENT DOCUMENTS

JP 2006-136714 A 6/2006
JP 2008-022928 A 2/2008
(Continued)

OTHER PUBLICATIONS

International Search Report and Written Opinion mailed on Mar. 15, 2022, received for PCT Application PCT/JP2022/003203, filed on Jan. 28, 2022, 8 pages including English Translation.

*Primary Examiner* — Heather R Jones
(74) *Attorney, Agent, or Firm* — XSENSUS LLP

(57) ABSTRACT

An image processing apparatus (13) according to one form of the present disclosure includes: an image input unit (13*b*) that receives an operative field image for an eye of a patient; an eyeball tracking unit (13*e*) that tracks an eyeball in the operative field image; and a display image generation unit (13*f*) that sets a plurality of regions having different display modes for the operative field image and generates a display image in which an annular or radial boundary in the plurality of regions indicates a specific position or a specific size with respect to the eye. The display image generation unit (13*f*) changes a position or a size of the boundary on the basis of
(Continued)

a tracking result of the eyeball and generates the display image.

24 Claims, 28 Drawing Sheets

(51) Int. Cl.
*G06T 7/50* (2017.01)
*G06T 7/62* (2017.01)
*H04N 13/296* (2018.01)

(52) U.S. Cl.
CPC . *H04N 13/296* (2018.05); *G06T 2207/10056* (2013.01)

(56) References Cited

U.S. PATENT DOCUMENTS

2018/0116501 A1* 5/2018 Akiba .................... G01N 21/17
2023/0201034 A1* 6/2023 Sacks .................. A61F 9/00754
606/4

FOREIGN PATENT DOCUMENTS

JP 2012-506272 A 3/2012
JP 2016-112358 A 6/2016
JP 2018-051208 A 4/2018

* cited by examiner

FIG.5

OPERATION START TIME
TARGET TIME
K1
K1
P1
P1
P1
P1
P1
P1
P1
P1

FIG.6

OPERATION START TIME

TARGET TIME

P1

K1

P1

P1

K1

P1

K1

IMAGE FOR LEFT EYE
IMAGE FOR RIGHT EYE
IMAGE IN CASE OF BEING VIEWED BY BOTH EYES
+
K2
K3
K2
K3

IMAGE FOR LEFT EYE
K1
PIXEL SHIFT
IMAGE FOR RIGHT EYE
K1
PIXEL SHIFT
CROSS-SECTIONAL VIEW (IMAGE OF DEPTH)
BEFORE PROCESSING
AFTER PROCESSING

IMAGE PROCESSING APPARATUS, IMAGE PROCESSING METHOD, AND OPERATION MICROSCOPE SYSTEM

CROSS-REFERENCE TO RELATED APPLICATIONS

The present application is based on PCT filing PCT/JP2022/003203, filed Jan. 28, 2022, which claims priority to Japanese Patent Application No. 2021-031261, filed Feb. 26, 2021, the contents of each are incorporated herein by reference.

FIELD

The present disclosure relates to an image processing apparatus, an image processing method, and an operation microscope system.

BACKGROUND

As a refraction correction method in ophthalmology, it is widely performed to eliminate refraction abnormality of a crystalline lens or the like and improve a visual function such as visual acuity, by inserting an artificial lens called an intraocular lens (IOL) into an eye. As the intraocular lens, an intraocular lens inserted into a capsule of a crystalline lens is most widely used as a substitute for the crystalline lens removed by a cataract operation. There are various intraocular lenses such as those (Phakic IOL) fixed (indwelled) in a ciliary sulcus or the like, in addition to the capsule of the crystalline lens.

When an ophthalmic operation such as the cataract operation is performed, in order to improve the visual function after the operation, an operator performs the operation so that an incision position, an incision shape, and a posture of an implant such as the intraocular lens to be inserted with respect to the eye become appropriate in light of a preoperative plan. At this time, it is desired to present information regarding the appropriate incision position, incision shape, and implant posture in a form that facilitates the operation for the operator. Therefore, Patent Literature 1 proposes technology for changing a position of a mark (pattern) indicating a preoperative plan according to a result of eyeball tracking.

CITATION LIST

Patent Literature

Patent Literature 1: JP 2016-112358 A

SUMMARY

Technical Problem

However, since the mark based on the preoperative plan is superimposed on an operative field image, occlusion (shielding) in which a part of the operative field image is invisible by the mark occurs. For this reason, since it is difficult for the operator to view the operative field image, it is difficult to realize the operation according to the preoperative plan with high accuracy.

Therefore, the present disclosure proposes an image processing apparatus, an image processing method, and an operation microscope system capable of realizing an operation according to a preoperative plan with high accuracy.

Solution to Problem

An image processing apparatus according to the embodiment of the present disclosure includes: an image input unit that receives an operative field image for an eye of a patient; an eyeball tracking unit that tracks an eyeball in the operative field image; and a display image generation unit that sets a plurality of regions having different display modes for the operative field image and generates a display image in which an annular or radial boundary in the plurality of regions indicates a specific position or a specific size with respect to the eye, wherein the display image generation unit changes a position or a size of the boundary on the basis of a tracking result of the eyeball and generates the display image.

An image processing method according to the embodiment of the present disclosure includes causing an image processing apparatus to: receive an operative field image for an eye of a patient; track an eyeball in the operative field image; and set a plurality of regions having different display modes for the operative field image and generate a display image in which an annular or radial boundary in the plurality of regions indicates a specific position or a specific size with respect to the eye, wherein the image processing apparatus changes a position or a size of the boundary on the basis of a tracking result of the eyeball and generates the display image.

An operation microscope system according to the embodiment of the present disclosure includes: an operation microscope that obtains an operative field image for an eye of a patient; an image processing apparatus that generates a display image; and a display device that displays the display image, wherein the image processing apparatus includes: an image input unit that receives the operative field image; an eyeball tracking unit that tracks an eyeball in the operative field image; and a display image generation unit that sets a plurality of regions having different display modes for the operative field image, and generates the display image in which an annular or radial boundary in the plurality of regions indicates a specific position or a specific size with respect to the eye, and the display image generation unit changes a position or a size of the boundary on the basis of a tracking result of the eyeball and generates the display image.

BRIEF DESCRIPTION OF DRAWINGS

FIG. 5 is a first diagram illustrating display image generation according to an embodiment of the present disclosure.

FIG. 6 is a second diagram illustrating display image generation according to an embodiment of the present disclosure.

FIG. 32 is a diagram illustrating an example 20 of a display image according to an embodiment of the present disclosure.

DESCRIPTION OF EMBODIMENTS

Figure 1:
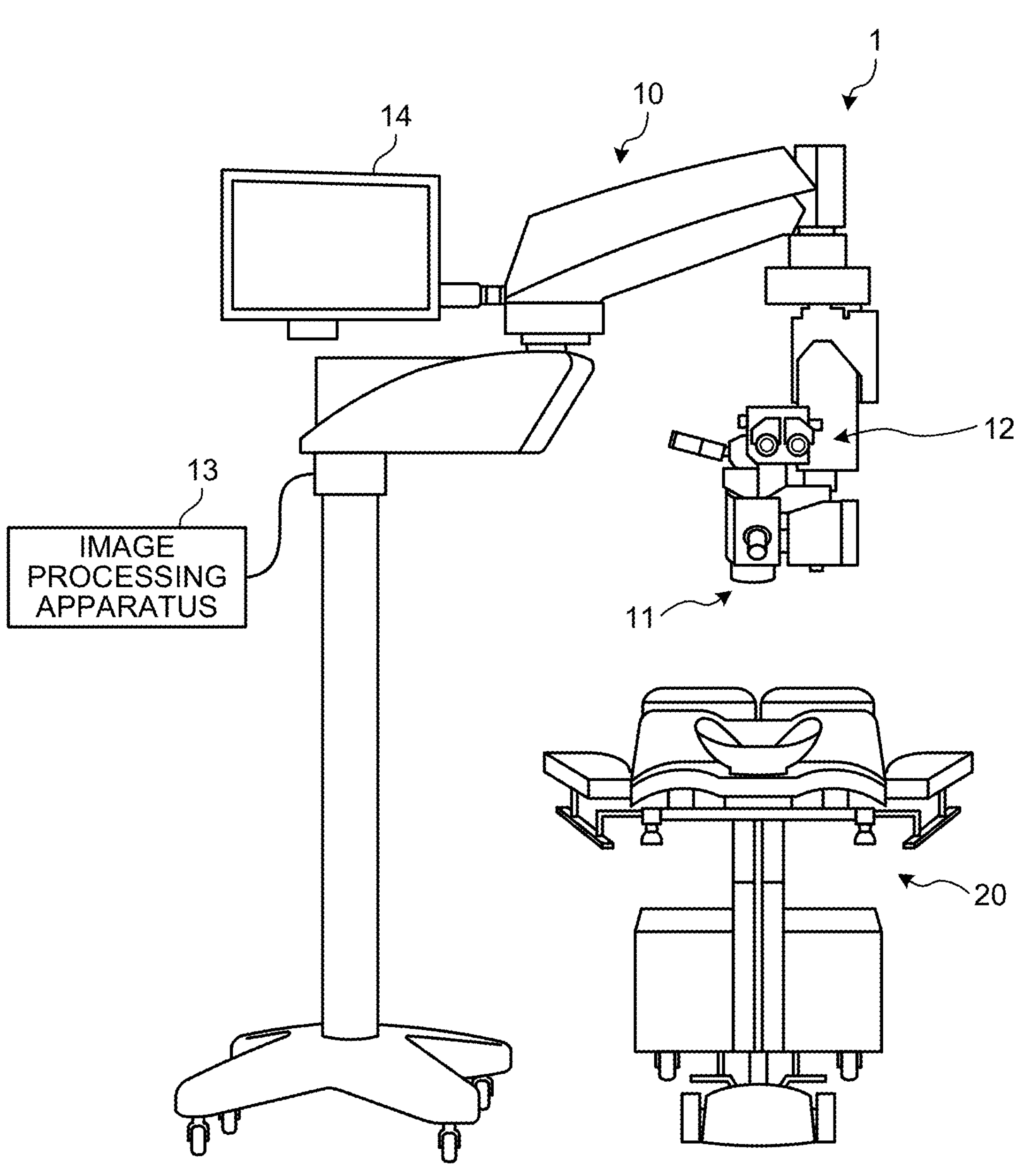
FIG. 1 is a diagram illustrating an example of a schematic configuration of an operation microscope system according to an embodiment of the present disclosure.

Hereinafter, embodiments of the present disclosure will be described in detail on the basis of the drawings. Note that apparatuses, methods, systems, and the like according to the present disclosure are not limited by these embodiments. In each of the following embodiments, basically the same parts are denoted by the same reference numerals, and redundant description is omitted.

One or more embodiments (including examples and modifications) described below can be individually implemented independently. On the other hand, at least some of a plurality of embodiments described below may be appropriately combined with at least some of other embodiments. The plurality of embodiments may include novel features different from each other. Therefore, the plurality of embodiments can contribute to solving different objects or problems, and can exhibit different effects.

The present disclosure will be described according to the following order of items.

1. Embodiments
  1-1. Example of Schematic Configuration of Operation Microscope System
  1-2. Example of Schematic Configuration of Operation Microscope
  1-3. Example of Schematic Configuration and Image Processing of Image Processing Apparatus
  1-4. Functions and Effects
2. Example of Schematic Configuration of Computer
3. Notes

1. EMBODIMENTS

1-1. Example of Schematic Configuration of Operation Microscope System

An example of a schematic configuration of an operation microscope system 1 according to an embodiment will be described with reference to FIG. 1. FIG. 1 is a diagram illustrating an example of a schematic configuration of the operation microscope system 1 according to the embodiment.

As illustrated in FIG. 1, the operation microscope system 1 has an operation microscope 10 and a patient bed 20. The operation microscope system 1 is a system used for an operation of an eye. A patient undergoes the operation of the eye while lying down on the patient bed 20. In addition, an operator who is a doctor performs the operation while observing the eye of the patient with the operation microscope 10.

The operation microscope 10 has an objective lens 11, an eyepiece lens 12, an image processing apparatus 13, and a monitor 14.

The objective lens 11 and the eyepiece lens 12 are lenses for magnifying and observing the eye of the patient to be operated.

The image processing apparatus 13 performs predetermined image processing on an image captured through the objective lens 11 and outputs various images, various types of information, and the like.

The monitor 14 displays an image captured through the objective lens 11 or various images, various types of information, and the like generated by the image processing apparatus 13. The monitor 14 may be provided separately from the operation microscope 10.

In the operation microscope system 1, for example, the operator performs the operation while viewing the eyepiece lens 12 and observing the eye of the patient through the objective lens 11. Further, the operator performs the operation while confirming an operative field image displayed on the monitor 14, various images (for example, an image before image processing, an image after the image processing, and the like), various types of information, and the like. Note that it is also possible to perform the operation using an image of only the monitor 14.

1-2. Example of Schematic Configuration of Operation Microscope

Figure 2:
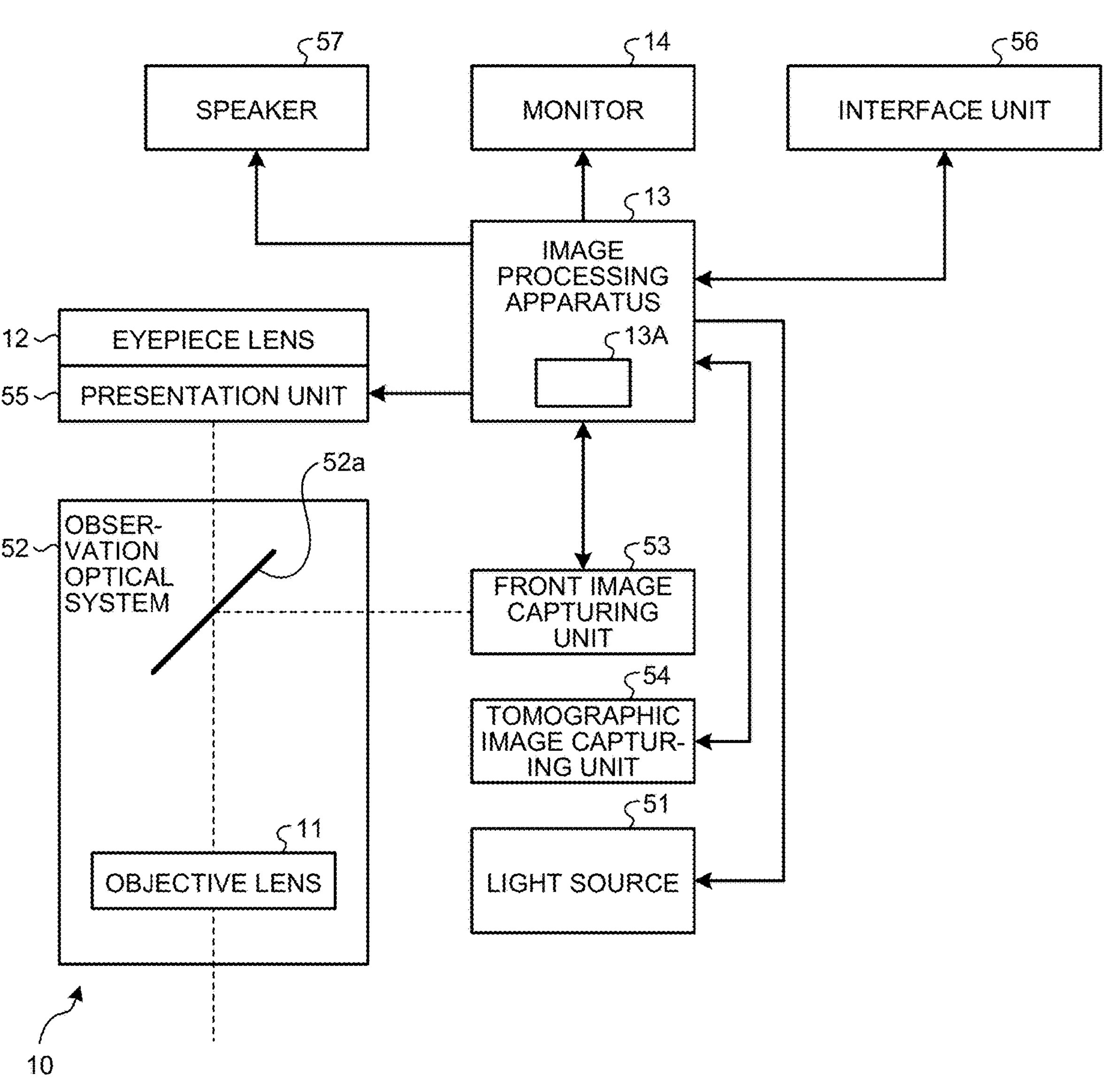
FIG. 2 is a diagram illustrating an example of a schematic configuration of an operation microscope according to an embodiment of the present disclosure.

An example of a schematic configuration of the operation microscope 10 according to the embodiment will be described with reference to FIG. 2. FIG. 2 is a diagram illustrating an example of a schematic configuration of the operation microscope 10 according to the embodiment.

As illustrated in FIG. 2, the operation microscope 10 has a light source 51, an observation optical system 52, a front image capturing unit 53, a tomographic image capturing unit 54, a presentation unit 55, an interface unit 56, and a speaker 57, in addition to the objective lens 11, the eyepiece lens 12, the image processing apparatus 13, and the monitor 14 described above. Note that the monitor 14 and the presentation unit 55 correspond to a display device.

The light source 51 emits illumination light according to the control of a control unit 13A included in the image processing apparatus 13 to illuminate the eye of the patient.

The observation optical system 52 includes, for example, optical elements such as the objective lens 11, a half mirror 52*a*, and a lens not illustrated in the drawings. The observation optical system 52 guides light (observation light) reflected from the eye of the patient to the eyepiece lens 12 and the front image capturing unit 53.

Specifically, the light reflected from the eye of the patient is incident on the half mirror 52*a* through the objective lens 11, a lens not illustrated in the drawings, or the like as observation light. Approximately half of the observation light incident on the half mirror 52*a* passes through the half mirror 52*a* as it is, and is incident on the eyepiece lens 12 through the transmissive presentation unit 55. On the other hand, the remaining half of the observation light incident on the half mirror 52*a* is reflected by the half mirror 52*a* and is incident on the front image capturing unit 53.

The front image capturing unit 53 includes, for example, a video camera or the like. The front image capturing unit 53 receives and photoelectrically converts the observation light incident from the observation optical system 52, thereby capturing a front image which is an image obtained by observing the eye of the patient from the front, that is, an image obtained by photographing the eye of the patient substantially from an eye axis direction. The front image capturing unit 53 captures the front image according to the control of the image processing apparatus 13, and supplies the obtained front image to the image processing apparatus 13.

The tomographic image capturing unit 54 includes, for example, an optical coherence tomography (OCT), a Scheimpflug camera, or the like. The tomographic image capturing unit 54 captures a tomographic image that is an image of a cross section of the eye of the patient according to the control of the image processing apparatus 13, and supplies the obtained tomographic image to the image processing apparatus 13. Here, the tomographic image is an image of a cross section in a direction substantially parallel to the eye axis direction in the eye of the patient.

Note that the tomographic image capturing unit 54 acquires a tomographic image by the interference principle using infrared light, for example, but an optical path of the infrared light at that time and a part of an optical path of the observation light in the observation optical system 52 may be a common optical path.

The eyepiece lens 12 condenses the observation light incident from the observation optical system 52 through the presentation unit 55 to form an optical image of the eye of the patient. As a result, the optical image of the eye of the patient is observed by the operator viewing the eyepiece lens 12.

The presentation unit 55 includes a transmissive or non-transmissive display device or the like, and is disposed between the eyepiece lens 12 and the observation optical system 52. The presentation unit 55 transmits the observation light incident from the observation optical system 52 and causes the observation light to be incident on the eyepiece lens 12, and presents (displays) various images (for example, a front image, a tomographic image, and the like) and various types of information supplied from the image processing apparatus 13 as necessary. For example, the various images, the various types of information, and the like may be superimposed on the optical image of the eye of the patient and presented, or may be presented in a peripheral portion of the optical image so as not to disturb the optical image. In addition, the transmissive display device and the non-transmissive display device are configured to be switchable, and are switched as necessary. For example, there are a transmission mode and a non-transmission mode, and these modes are changed by the operator or the like, and the transmissive display device and the non-transmissive display device are switched.

The image processing apparatus 13 has the control unit 13A that controls the operation of the entire operation microscope 10. For example, the control unit 13A changes an illumination condition of the light source 51 or changes the zoom magnification of the observation optical system 52. Furthermore, the control unit 13A controls image acquisition of the front image capturing unit 53 and the tomographic image capturing unit 54, on the basis of operation information or the like of the operator or the like supplied from the interface unit 56.

The interface unit 56 includes, for example, a communication unit or the like. The communication unit receives a command from an operation unit such as a touch panel superimposed on the monitor 14, a foot switch, a controller, or a remote controller, or communicates with an external device. The interface unit 56 supplies information or the like according to the operation of the operator or the like to the image processing apparatus 13. In addition, the interface unit 56 outputs device control information or the like for controlling an external device supplied from the image processing apparatus 13 to the external device.

The monitor 14 displays various images such as a front image and various types of information on a display screen according to the control of the control unit 13A of the image processing apparatus 13.

According to the control of the control unit 13A of the image processing apparatus 13, for example, when a dangerous situation is detected during the operation, the speaker

57 outputs a sound such as a buzzer sound or a melody sound, a message (voice), or the like in order to notify the operator or the like of the dangerous situation. Note that the operation microscope 10 may include a rotating lamp or an indicating lamp (lamp) for notifying the operator or the like of the dangerous situation.

In the operation microscope system 1 having the above configuration, by using a display screen that presents one or both of a specific position and a specific size (a specific position and a specific size with respect to the eye) based on a preoperative plan due to boundaries of a plurality of regions having different display modes, occlusion does not occur, the operator can easily view the operative field image, and the above-described specific position or specific size can also be grasped, so that the ophthalmic operation according to the preoperative plan can be performed with high accuracy. The difference in the display mode is a difference in parameters or the like related to the display condition, and is, for example, a difference in luminance, a difference in saturation, a difference in color temperature, a difference in color, a difference in contrast, a difference in sharpness, or the like.

Figure 3:
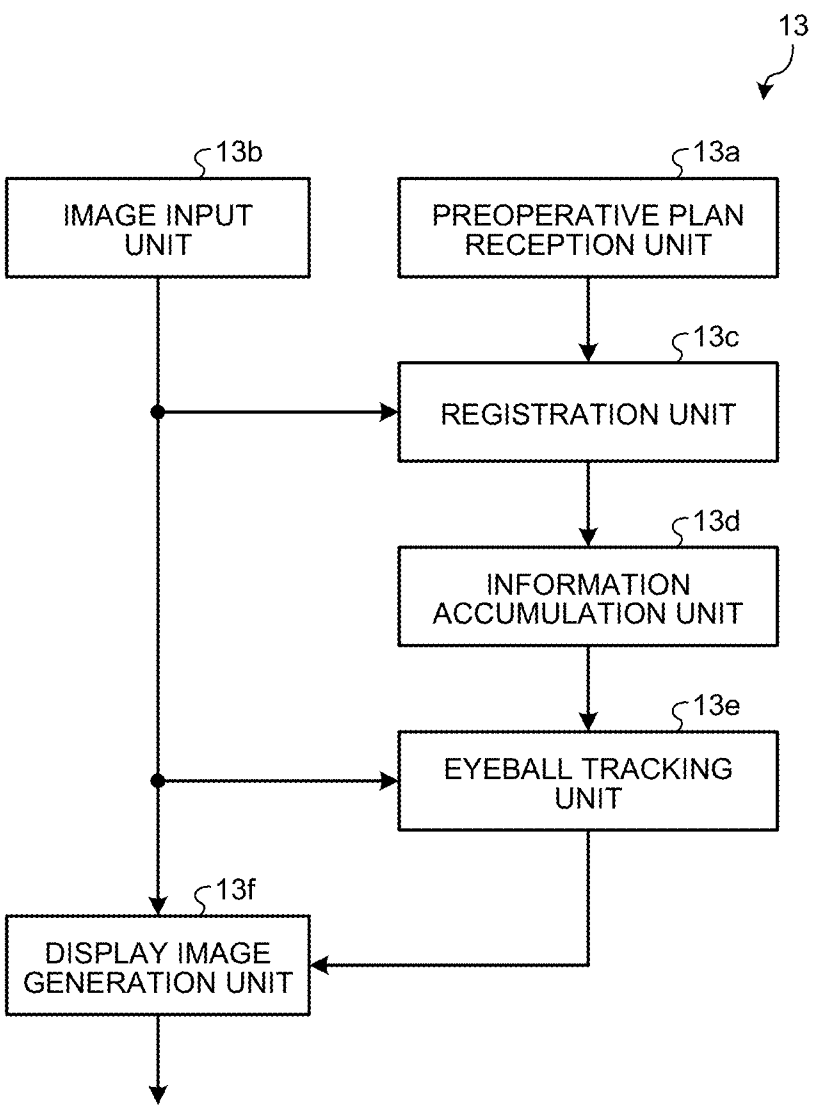
FIG. 3 is a diagram illustrating an example of a schematic configuration of an image processing apparatus according to an embodiment of the present disclosure.

1-3. Example of Schematic Configuration and Image Processing of Image Processing Apparatus An example of a schematic configuration and image processing of the image processing apparatus 13 according to the embodiment will be described with reference to FIG. 3. FIG. 3 is a diagram illustrating an example of a schematic configuration (configuration and processing flow) of the image processing apparatus 13 according to the embodiment.

As illustrated in FIG. 3, the image processing apparatus 13 includes a preoperative plan reception unit 13*a*, an image input unit 13*b*, a registration unit 13*c*, an information accumulation unit 13*d*, an eyeball tracking unit 13*e*, and a display image generation unit 13*f*.

The preoperative plan reception unit 13*a* receives preoperative plan information (for example, a preoperative image, posture information, and the like of the preoperative plan) for the eye of the patient. The posture information of the preoperative plan includes information (size information, position information, direction information, and the like) regarding a size of an index (an index related to the operation) based on a part such as a corneal limbus in the preoperative image, a position of the index, and a direction of the index around the eye axis (a position of a rotation direction around the eye axis). For example, the size of the index, the position of the index, the direction of the index around the eye axis, and the like include the position, shape, size, and the like of the incision, and the position and direction of an implant such as an intraocular lens to be inserted. Note that the direction around the eye axis is defined by an angle in a rotation direction around the eye axis with respect to a reference line orthogonal to the eye axis. However, both the position of the coordinate system of the index and the position of the rotation direction around the eye axis correspond to position information of the index (position information of a specific position).

The image input unit 13*b* receives the operative field image (front image) from the front image capturing unit 53 (see FIG. 2), and supplies the received operative field image (for example, an operative field image at the start of the operation, a real-time operative field image during the operation, and the like) to the registration unit 13*c*, the eyeball tracking unit 13*e*, the display image generation unit 13*f*, and the like.

The registration unit 13*c* compares the preoperative image of the preoperative plan with the operative field image at the start of the operation to obtain a correspondence relation between the preoperative image of the preoperative plan and the operative field image at the start of the operation, for example, a conversion parameter (as an example, a conversion parameter of coordinate conversion) from the preoperative image to the operative field image at the start of the operation. Then, the registration unit 13*c* supplies the obtained relation information regarding the conversion parameter to the information accumulation unit 13*d* together with the operative field image at the start of the operation.

The information accumulation unit 13*d* converts the posture information of the preoperative plan in accordance with the operative field image at the start of the operation on the basis of the relation information supplied from the registration unit 13*c* and the operative field image at the start of the operation, and accumulates the operative field image at the start of the operation and the posture information of the preoperative plan converted in accordance with the operative field image at the start of the operation.

The eyeball tracking unit 13*e* tracks an eyeball in the real-time operative field image by comparing the operative field image at the start of the operation with the real-time operative field image. Further, the eyeball tracking unit 13*e* supplies relation information (for example, a conversion parameter or the like) indicating a relation between the posture information of the eyeball in the real-time operative field image and the posture information of the preoperative plan accumulated by the information accumulation unit 13*d* to the display image generation unit 13*f* as a tracking result. Similarly to the posture information of the preoperative plan, the posture information of the eyeball includes information (size information, position information, direction information, and the like) regarding a size of the eyeball, a position of the eyeball, and a direction of the eyeball around the eye axis (a position in the rotation direction around the eye axis). However, both the position in the coordinate system of the eyeball and the position in the rotation direction around the eye axis correspond to the position information of the eyeball.

The display image generation unit 13*f* sets a plurality of regions having different display modes for the real-time operative field image by processing the real-time operative field image, and generates a display image in which a boundary of each region indicates a specific position or a specific size with respect to the eye of the patient. At this time, the display image generation unit 13*f* processes the real-time operative field image, that is, each region such that the boundary of each region indicates the specific position or the specific size on the basis of the converted posture information of the preoperative plan. Further, the display image generation unit 13*f* processes the real-time operative field image so as to change the posture (the position, the direction, the size, and the like) of the boundary of each region on the basis of the tracking result of the eyeball of the real-time operative field image, and generates a display image. At this time, the display image generation unit 13*f* processes the position and the size of the boundary in the real-time operative field image such that the relation between the position and the size of the boundary with respect to the eyeball in the operative field image at the start of the operation does not change on the basis of the relation information supplied from the eyeball tracking unit 13*e*, and generates the display image.

Example 1 of Display Image

Figure 4:
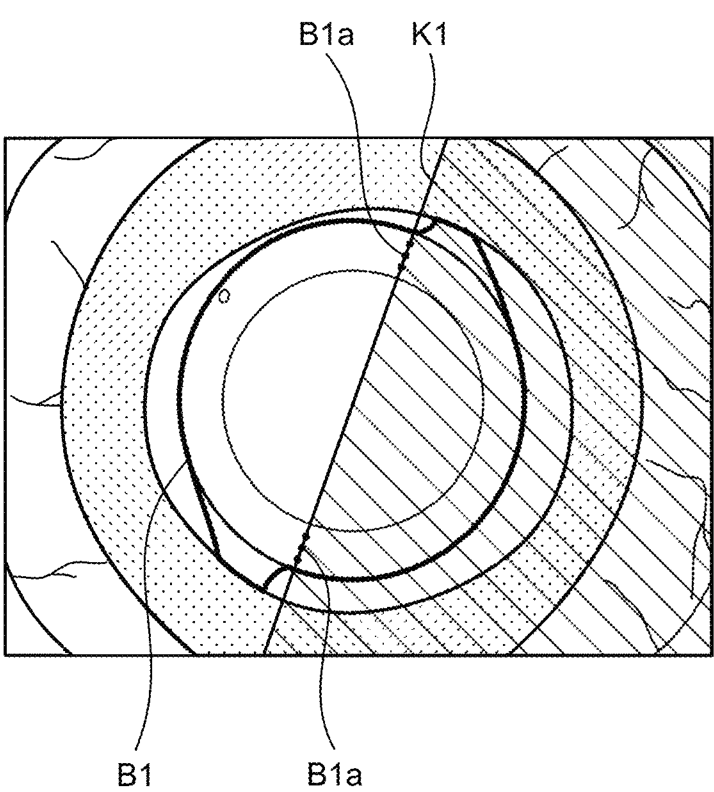
FIG. 4 is a diagram illustrating an example 1 of a display image according to an embodiment of the present disclosure.

An example 1 of the display image according to the embodiment will be described. FIG. 4 is a diagram illustrating the example 1 of the display image according to the embodiment.

As illustrated in FIG. 4, in the display image, a boundary K1 between two regions (left and right regions) having different display modes is presented. The boundary K1 indicates a specific position on the basis of the preoperative plan, another plan, or the like, that is, a specific position regarding the operation. The boundary K1 is converted so as to move by the above-described movement amount in a movement direction of the eyeball such that a posture change of the boundary K1 with respect to the eyeball is eliminated according to the movement direction and the movement amount of the eyeball. The display image having such a boundary K1 is displayed on the display screen by both or one of the monitor 14 and the presentation unit 55. Note that, in a case where the presentation unit 55 displays the display image having the boundary K1, the transmissive display device is switched to the non-transmissive display device, and the non-transmissive display device is used.

In the example of FIG. 4, the boundary K1 is a boundary of a line shape, and is a boundary passing through a center position where an intraocular lens B1 such as the toric IOL for performing astigmatism correction is desired to be indwelled. The boundary K1 indicates a boundary line for alignment of the intraocular lens B1 (a target position for installation of the intraocular lens B1). Two marks B1*a* (as an example, three points arranged in a straight line) of the intraocular lens B1 are aligned with respect to the boundary K1. For example, in a case where the intraocular lens B1 is a toric IOL, it is necessary to match a toric axis of the intraocular lens B1 with an astigmatism axis of the patient, and a sufficient astigmatism correction effect cannot be obtained in a case where a deviation occurs in the direction around the eye axis (the position in the rotation direction around the eye axis). Therefore, the two marks B1*a* indicating the toric axis are imprinted on an end point of the toric IOL, and the direction of the toric IOL around the eye axis can be grasped. At the time of the operation, the mark B1*a* of the toric IOL is aligned with the boundary K1 in the real-time operative field image, and the toric IOL is placed in the eye.

Here, in many ophthalmic operation guidance systems, the preoperative image and the image at the start of the operation (operative field image at the start of the operation) are registered, and then a mark based on the preoperative plan is mapped and displayed on the real-time image by comparison (tracking) of the image at the start of the operation and the real-time image (real-time operative field image). However, in this method, since the mark based on the preoperative plan is superimposed on the operative field image, occlusion (shielding) in which a part of the operative field image is invisible by the mark occurs.

For this reason, it becomes difficult for the operator to view the operative field image, and it becomes difficult to perform axial alignment of the toric IOL (intraocular lens for astigmatism correction), centering of the IOL, wound creation, anterior capsulotomy, and the like. Therefore, it is difficult to accurately perform the operation according to the preoperative plan. Therefore, by presenting the specific position or the specific size regarding the operation not by the mark but by the boundary (for example, the boundary K1) of each region having a different display mode, it is possible to prevent the occurrence of occlusion and to accurately perform the operation according to the preoperative plan.

(Specific Processing Flow)

Figure 5:
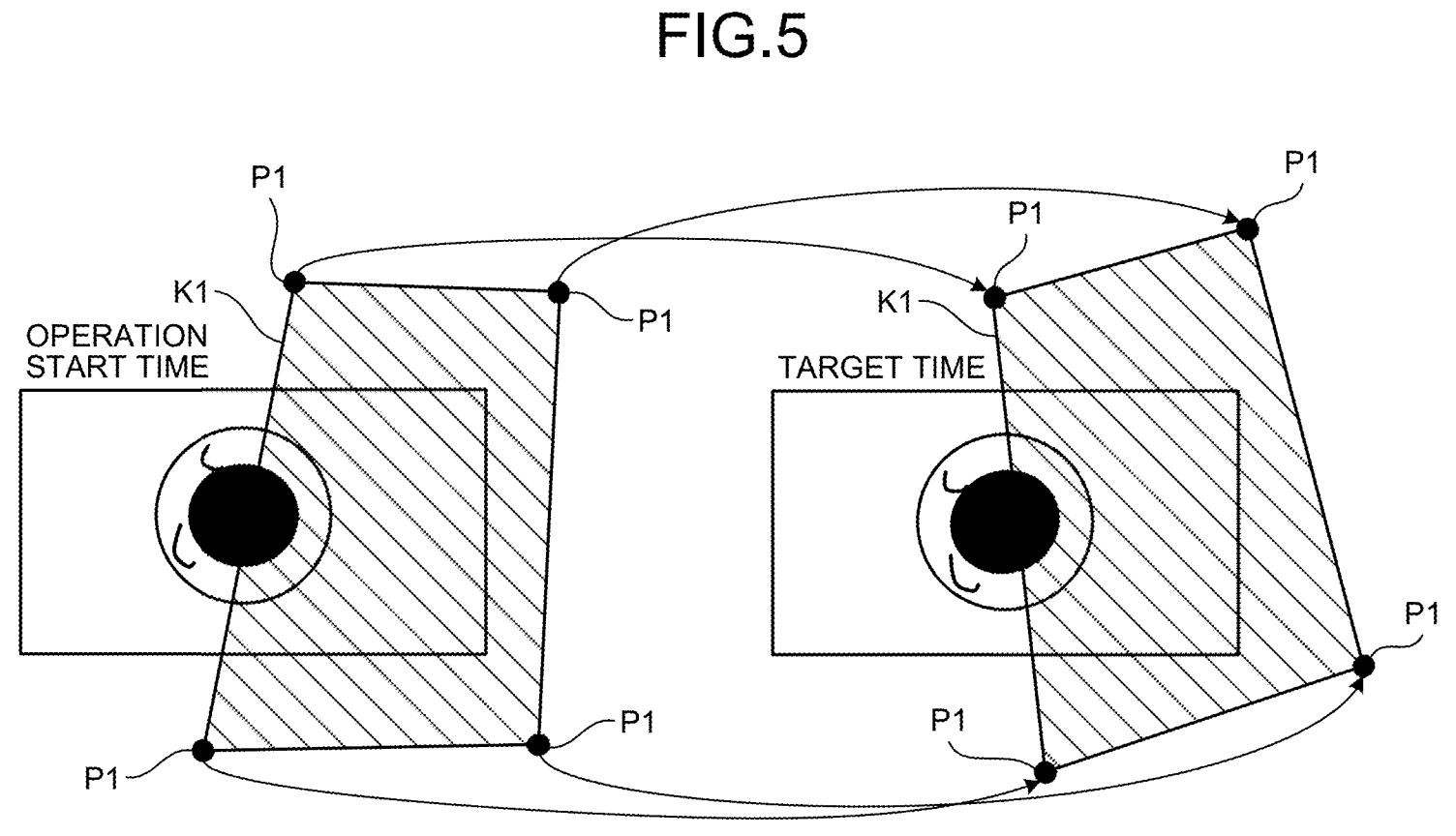
Figure 6:
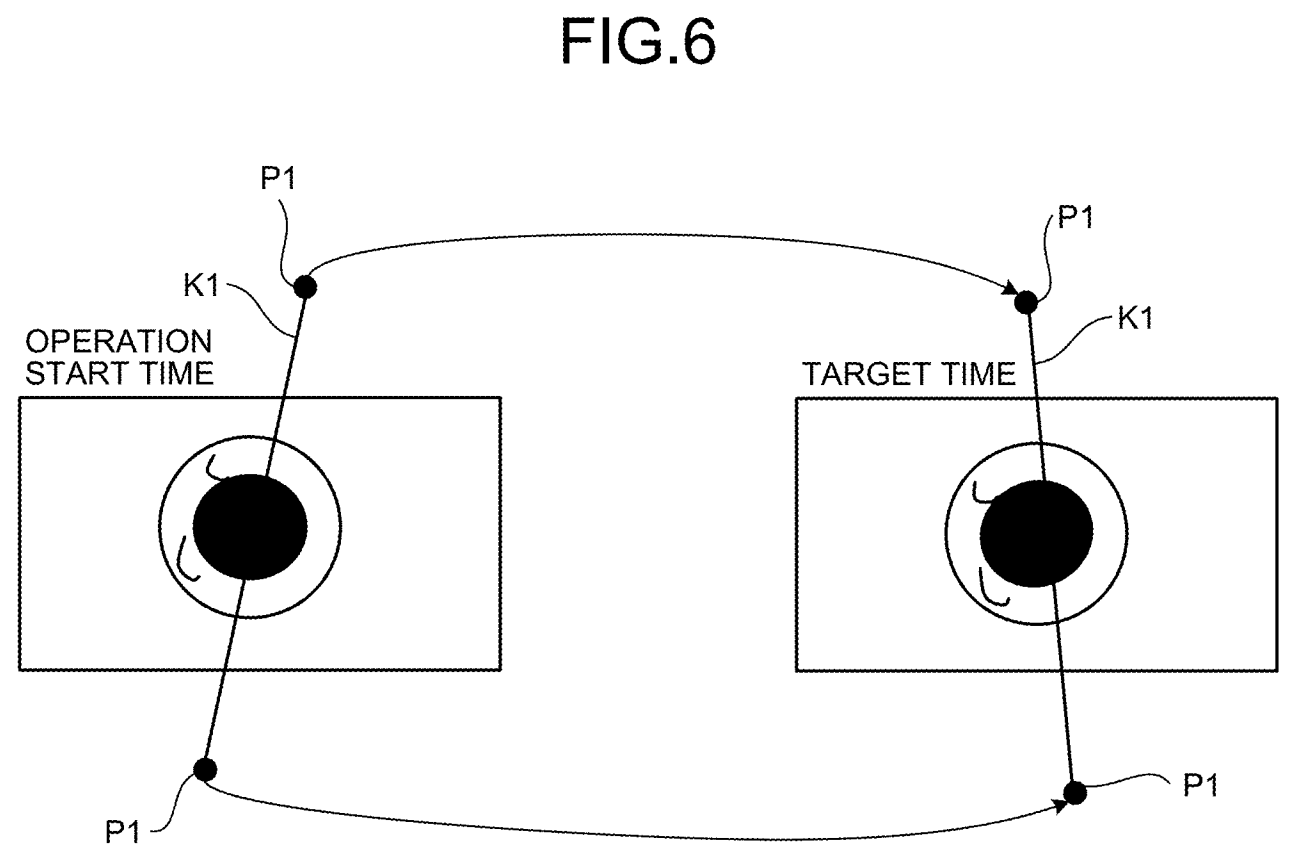

Specific processing is performed according to the following flow. Registration, tracking, image generation, and image presentation are sequentially performed. FIGS. 5 and 6 are diagrams illustrating display image generation (conversion processing) according to the embodiment.

In the registration, preoperative plan information including a preoperative image (for example, an eyeball image or the like) and an image at the start of the operation (operative field image at the start of the operation) are received, and the direction or the position of the eyeball at the time of making the preoperative plan is matched with the reference of the direction or the position of the eyeball during the operation. As an alignment method, for example, alignment may be automatically performed by image processing using the preoperative image and the image at the start of the operation, or alignment may be performed by a user manually adjusting the position or the direction (for example, a rotation angle or the like). When the registration is successful, operation plan information based on the coordinates of the image at the start of the operation is held.

In the tracking, the movement of the eyeball from the start of the operation is tracked, and a conversion parameter (coordinate conversion parameter) from the image at the start of the operation to the coordinates at the tracking time is obtained. As a tracking method, for example, feature points may be extracted from both the preoperative image and the image at the start of the operation, and a conversion parameter may be obtained from a correspondence relation thereof, or a feature point may be extracted from one image, and a movement of the feature point may be searched for and then a conversion parameter may be obtained, or an image may be input to machine learning, and a conversion parameter may be obtained on a learning basis.

In the image generation, on the basis of the conversion parameter extracted by the tracking, the control point coordinates P1 of the region (for example, a modulation region or the like) where the boundary K1 indicating the specific position is generated are converted from the operation plan information obtained by the registration as illustrated in FIG. 5, or the control point coordinates P1 of the boundary line indicating the boundary K1 are converted as illustrated in FIG. 6. Thereafter, when a conversion target is the control point coordinates P1 of the region, the image processing is performed on the region, and when the conversion target is the control point coordinates P1 of the boundary line, the image processing is performed on the region based on the boundary line to generate a display image. This display image includes a plurality of regions having different display modes.

Here, in the example of FIG. 5, the control point coordinates P1 indicating the region are four points, but the control point coordinates P1 may be three or more points. A region surrounded by these control point coordinates P1 is a processing target. In the example of FIG. 6, the control point coordinates P1 indicating the boundary line are two points, but the control point coordinates P1 may be two or more points. When the boundary has a complicated shape, a plurality of control point coordinates, that is, a plurality of control points may be added. When the boundary line is determined, one of the left and right regions (or one of the upper and lower regions) of the boundary line is a processing target. Note that the control point coordinates P1 indicating the region or the boundary line may be connected by a straight line, may be smoothly connected by spline interpolation or the like, or may be connected by a specific shape such as a semicircle passing through two points. In addition, the number of regions to be processing targets is not limited to one, and may be plural.

In the image presentation, the display image generated by the image generation processing is presented as operative field video. The display image (see FIG. 4) having the boundary K1 is displayed on the display screen by both or one of the monitor 14 and the presentation unit 55.

Here, as the coordinate conversion, for example, an affine conversion, a homography conversion, or the like can be used. Further, as the image processing, the image processing is realized by adjusting parameters such as luminance (brightness), contrast (shading), saturation, color temperature, sharpness, gray scaling, and changing a specific color to another specific color, that is, changing a pixel value of the image. Specifically, for example, processing based on a calculation formula (for example, non-linear calculation such as gain adjustment, offset processing, and y processing, and the like), processing by a lookup table (for example, changing from a specific color to a specific color, conversion from a specific luminance value to a specific luminance value in order to change contrast, and the like), processing by a spatial filter, or the like can be used alone or in combination. At this time, the display image generation unit 13*f* may automatically select and execute processing for making a boundary conspicuous with respect to an original operative field image (original image). As an example of the conversion from the specific luminance value to the specific luminance value, there is a change of an S-shaped curve of contrast.

In the image processing, regarding the luminance, for example, a specific channel is changed. Furthermore, regarding the contrast, for example, a gain according to a value of the specific channel is added. Regarding the saturation, for example, a uniform gain is added to a specific channel. Regarding the color temperature, a uniform gain different for each channel is added. Regarding the gray scaling, for example, a specific channel value is changed. Regarding the color change, for example, conversion is performed according to the pixel value.

Note that the image has color information in the form of a channel, for example. An RGB image has three channels of red, green, and blue. Further, an HSL image has three channels of hue, saturation, and luminance (Lightness/Luminance or Intensity). Further, a CMYK image has four channels of cyan, magenta, yellow, and black.

Further, in image generation, an information pattern to be presented and a processing method may be changed on the basis of an instruction of the user such as the operator. Examples of the information pattern to be presented include various information patterns (various display patterns) according to wound creation, anterior capsulotomy, axial alignment of toric IOL (intraocular lens for astigmatism correction), centering of IOL, and the like. For example, the user can select an information pattern to be presented or a processing method by operating an operation unit.

The tracking takes a processing time. For this reason, if the operative field image is created after the tracking information is generated, the delay between the image and the reality increases. Therefore, the delay of the image creation may be suppressed by ignoring the tracking information delay and using the latest calculated past tracking information in the image generation.

Examples 2 to 7 of Display Image

Examples 2 to 7 of the display image according to the embodiment will be described with reference to FIGS. 7 to 12. FIGS. 7 to 12 are diagrams illustrating the examples 2 to 7 of the display image according to the embodiment. In the examples 2 to 7, variations of the display image will be described.

Figure 7:
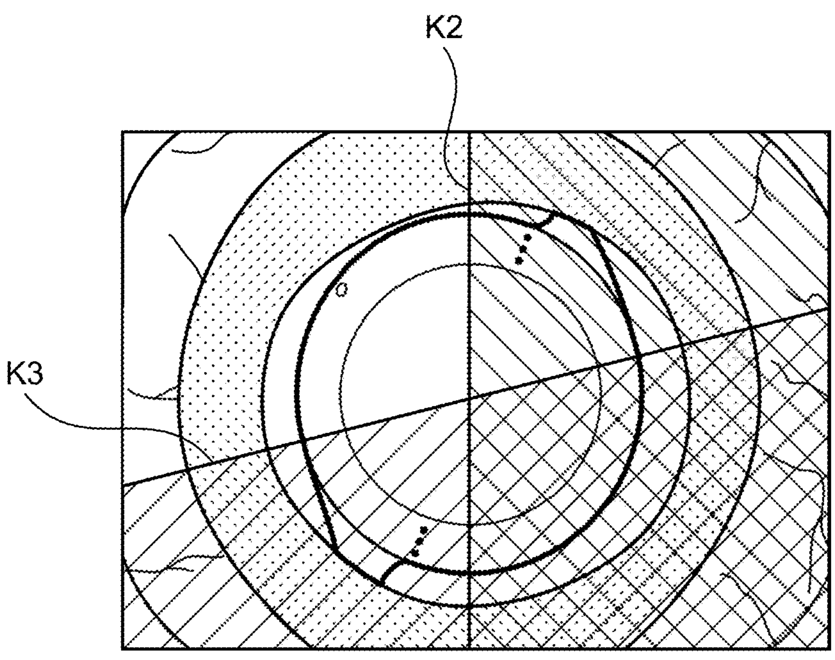
FIG. 7 is a diagram illustrating an example 2 of a display image according to an embodiment of the present disclosure.

As illustrated in FIG. 7, two boundaries K2 and K3 indicating a center position are presented in the display image. In the example of FIG. 7, an intersection of the boundaries K2 and K3 indicates, for example, a center position (for example, an eye axis position and the like) for IOL installation. Further, in the example of FIG. 7, a region on the right of the boundary K2 in the operative field image is processed, and a region below the boundary K3 is processed.

Figure 8:
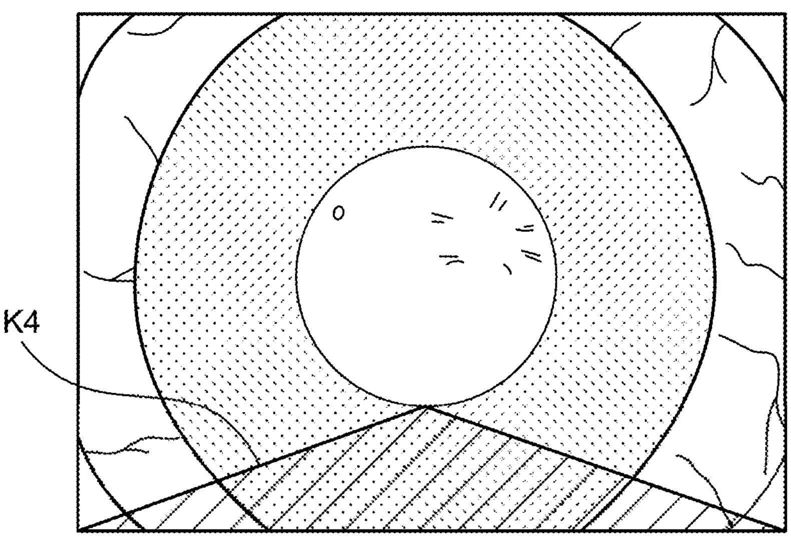
FIG. 8 is a diagram illustrating an example 3 of a display image according to an embodiment of the present disclosure.

As illustrated in FIG. 8, a boundary K4 indicating an incision position is presented in the display image. In the example of FIG. 8, the boundary K4 is two sides of a triangle, and a vertex of the triangle indicates the incision position (for example, an incision start position and the like). Further, in the example of FIG. 8, a region (triangular region) below the boundary K4 in the operative field image is processed.

Figure 9:
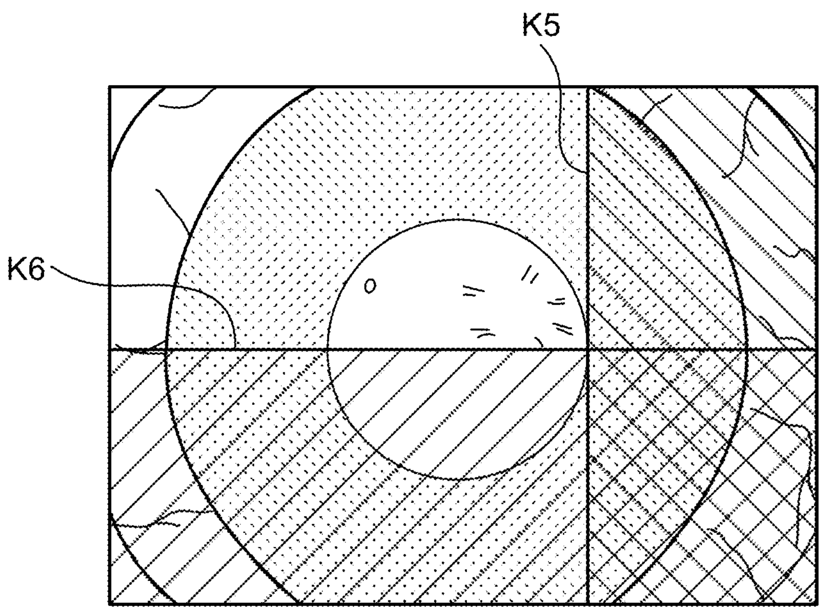
FIG. 9 is a diagram illustrating an example 4 of a display image according to an embodiment of the present disclosure.

As illustrated in FIG. 9, two boundaries K5 and K6 indicating an incision position are presented in the display image. In the example of FIG. 9, an intersection of the boundaries K5 and K6 indicates the incision position (for example, an incision start position and the like). Further, in the example of FIG. 9, a region on the right of the boundary K5 in the operative field image is processed, and a region below the boundary K6 is processed.

Figure 10:
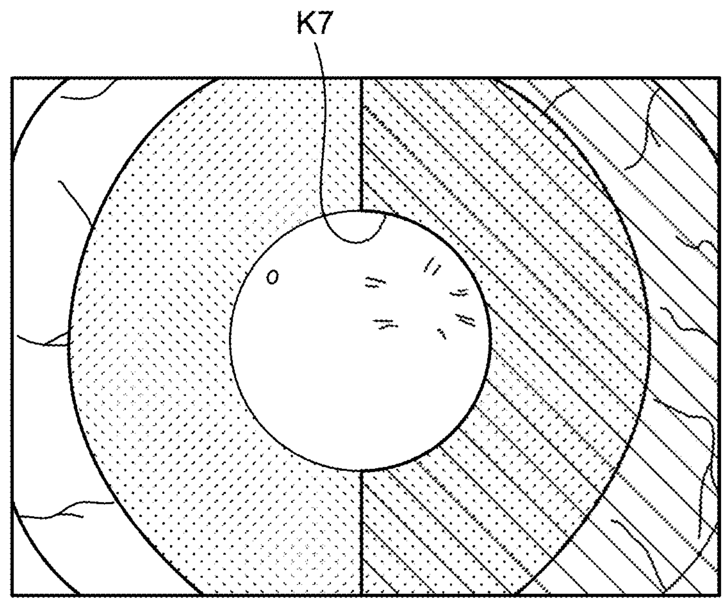
FIG. 10 is a diagram illustrating an example 5 of a display image according to an embodiment of the present disclosure.

As illustrated in FIG. 10, a boundary K7 indicating an incision size and an incision position is presented in the display image. In the example of FIG. 10, the boundary K7 indicates an incision size and an incision position (for example, a continuous incision position or the like) for CCC (anterior capsulotomy of a crystalline lens), for example. The boundary K7 functions, for example, as a boundary of a shape having a semicircle, that is, a semi-circle boundary (semicircle for forming a target circle for anterior capsulotomy). Further, in the example of FIG. 10, a region on the right of the boundary K7 in the operative field image is processed. Note that, as the center of the annular shape such as the target circle described above, a corneal limbus center, a pupil center, a preoperation pupil center, a visual axis, an anterior capsulotomy edge center, and the like can be used in addition to the eye axis.

Figure 11:
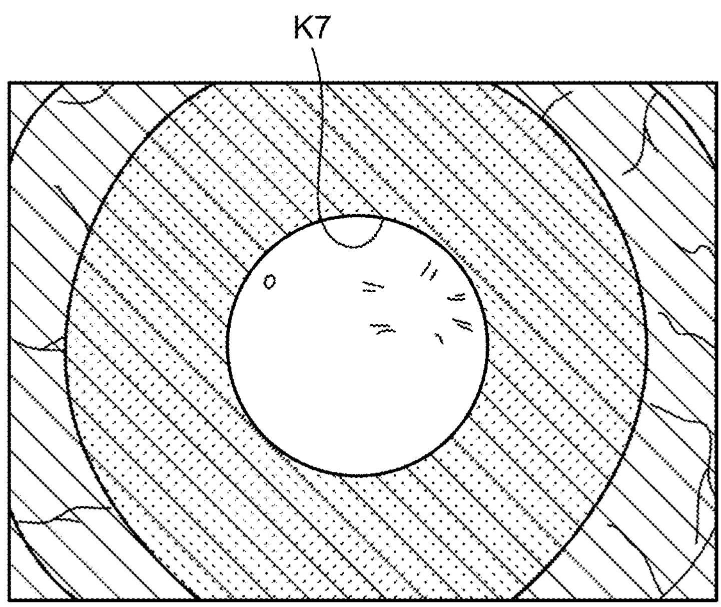
FIG. 11 is a diagram illustrating an example 6 of a display image according to an embodiment of the present disclosure.

As illustrated in FIG. 11, a boundary K7 indicating an incision size and an incision position is presented in an annular shape in the display image. In the example of FIG. 11, the annular boundary K7 indicates an incision size and an incision position (for example, a continuous incision position or the like) for CCC (anterior capsulotomy of a crystalline lens), for example. Further, in the example of FIG. 11, a region outside the boundary K7 in the operative field image is processed.

Figure 12:
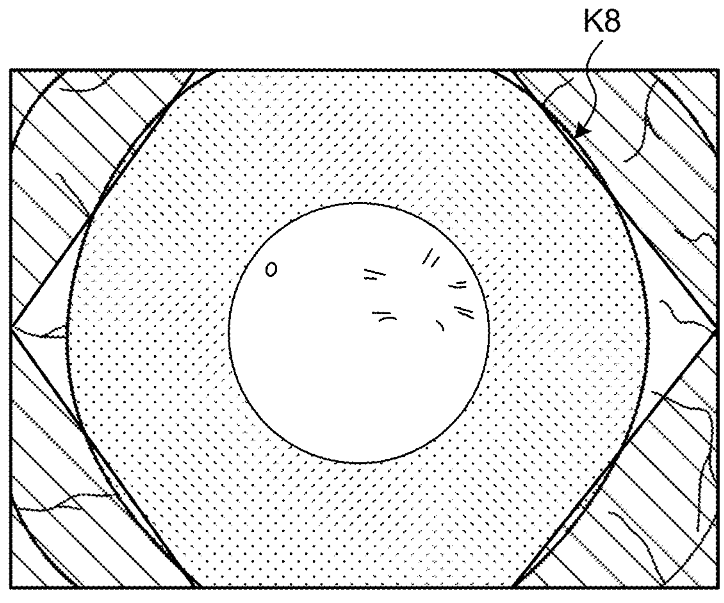
FIG. 12 is a diagram illustrating an example 7 of a display image according to an embodiment of the present disclosure.

As illustrated in FIG. 12, a boundary K8 indicating a specific region, that is, a region size and a region position of the specific region is presented in the display image. In the example of FIG. 12, the boundary K8 is hexagonal sides (or four sides) of a hexagon, and indicates the region size and the region position of the specific region. The boundary K8 indicates to the operator that the eyeball (eye) is brought to the center of the operative field image in a case where the sight of the eyeball is lost in tracking, for example. Further, in the example of FIG. 12, a region outside the boundary K8 in the operative field image is processed.

Examples 8 to 10 of Display Image

Figure 13:
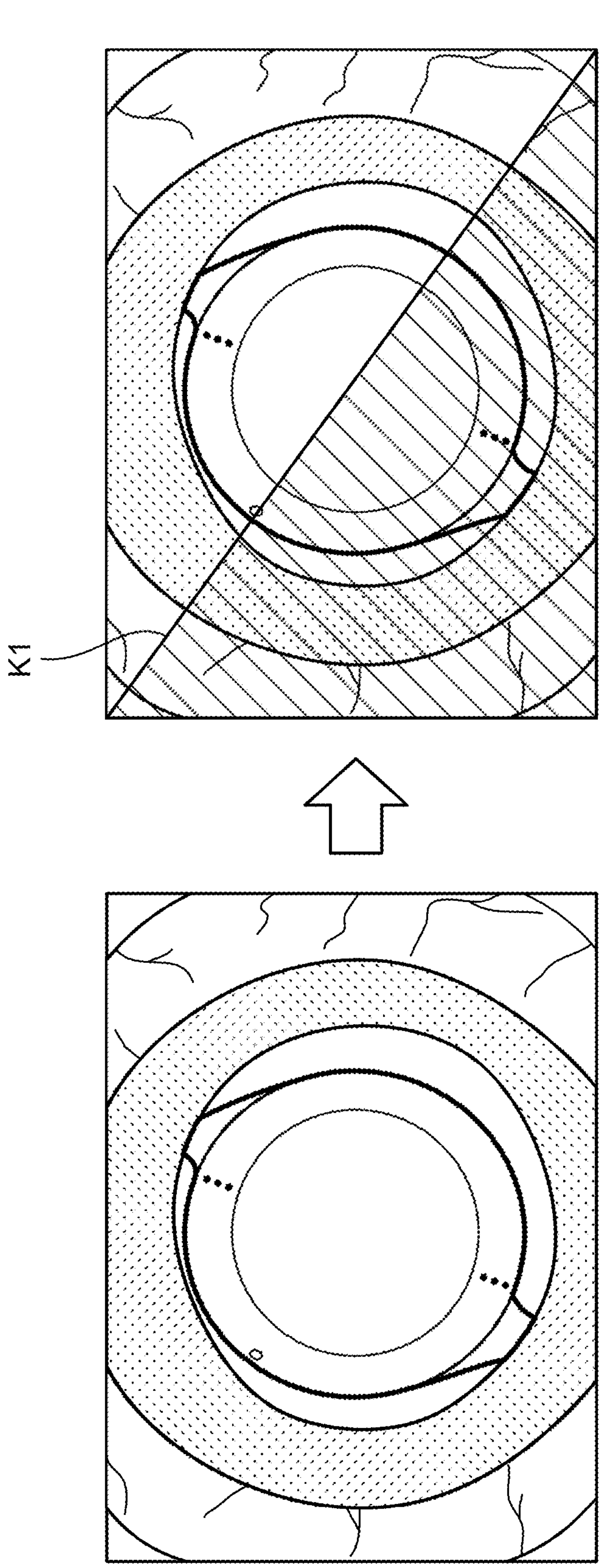
FIG. 13 is a diagram illustrating an example 8 of a display image according to an embodiment of the present disclosure.
Figure 14:
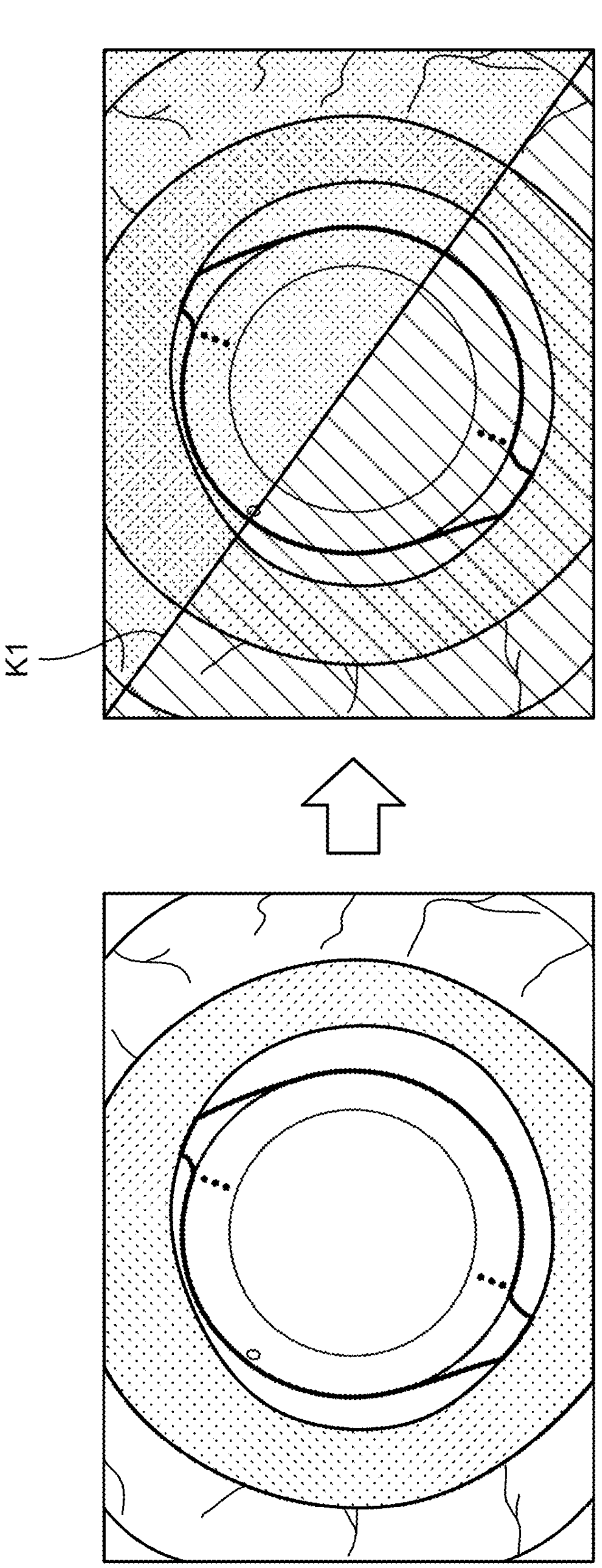
FIG. 14 is a diagram illustrating an example 9 of a display image according to an embodiment of the present disclosure.
Figure 15:
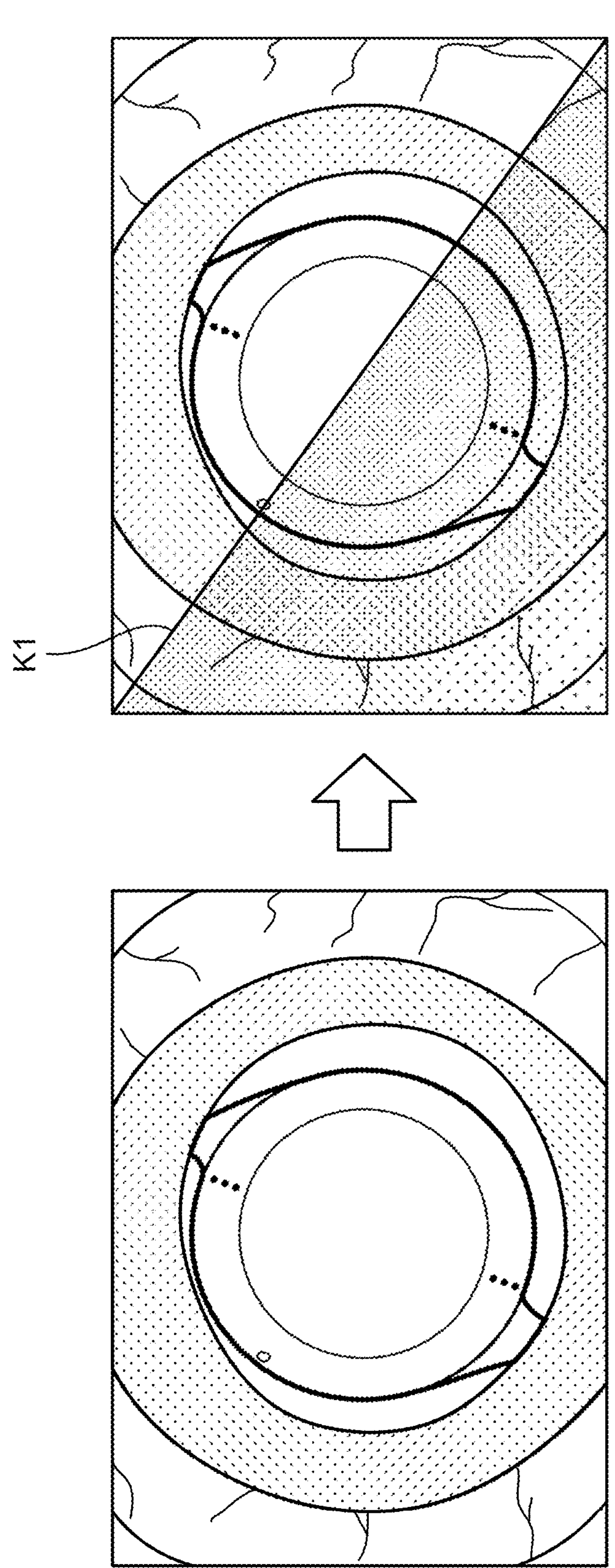
FIG. 15 is a diagram illustrating an example 10 of a display image according to an embodiment of the present disclosure.

Examples 8 to 10 of the display image according to the embodiment will be described with reference to FIGS. 13 to 15. FIGS. 13 to 15 are diagrams illustrating the examples 8 to 10 of the display image according to the embodiment. In the examples 9 and 10, an additional point for reducing a difference between an image before processing and an image after the processing while maintaining the clarity of the boundary K1 will be described.

As illustrated in FIG. 13, a region to which image processing is applied may be a region on one side of the boundary K1. In a case where the region to which the image processing is applied is a region on one side of the boundary K1, a change amount of the region on one side to which the image processing is applied is large, and a region on one side to which the image processing is not applied remains. That is, in the case of processing the region on one side, since a modulation is performed at a level at which the boundary K1 can be viewed, there is an advantage that a difference from an original image increases in the region on the processed side, and there is also a region that is not processed.

As illustrated in FIG. 14, a region to which the image processing is applied may be regions on both sides of the boundary K1. In the example of FIG. 14, the region on one side (the region on the boundary K1) is brighter by 10% than the original image (the operative field image before processing), and the region on the other side (the region below the boundary K1) is darker by 10% than the original image. By applying different processing to the regions on both sides as described above, it is possible to reduce the amount of change from the original image while maintaining the clarity of a boundary gap. That is, in the case of processing the regions on both sides, there is no unprocessed region and the same boundary gap is realized by the processing for the regions on both sides. Therefore, there is an advantage that the difference between the original image and the processed operative field image can be kept within a small range.

As illustrated in FIG. 15, when there is a difference between the regions on both sides of the boundary K1 (difference in display mode), information can be transmitted. Therefore, the intensity of processing (for example, the intensity of modulation) for the region may be decreased as the distance from the boundary K1 increases. In the example of FIG. 15, in the region on the left of the boundary K1, the intensity of processing on the region decreases as the distance from the boundary K1 increases. For example, in a case where the processing for the region is processing for increasing the luminance, when the intensity of the processing for increasing the luminance for the region decreases as the distance from the boundary K1 increases, the luminance of the region decreases as the distance from the boundary K1 increases. As described above, by decreasing the intensity of the processing on the region as the distance from the boundary K1 increases, the difference between the original image and the processed operative field image can be decreased in the portion away from the boundary K1. That is, the clarity of the gap of the boundary K1 can be maintained, and the region away from the boundary K1 can be brought close to the original image.

Examples 11 and 12 of Display Image

Figure 16:
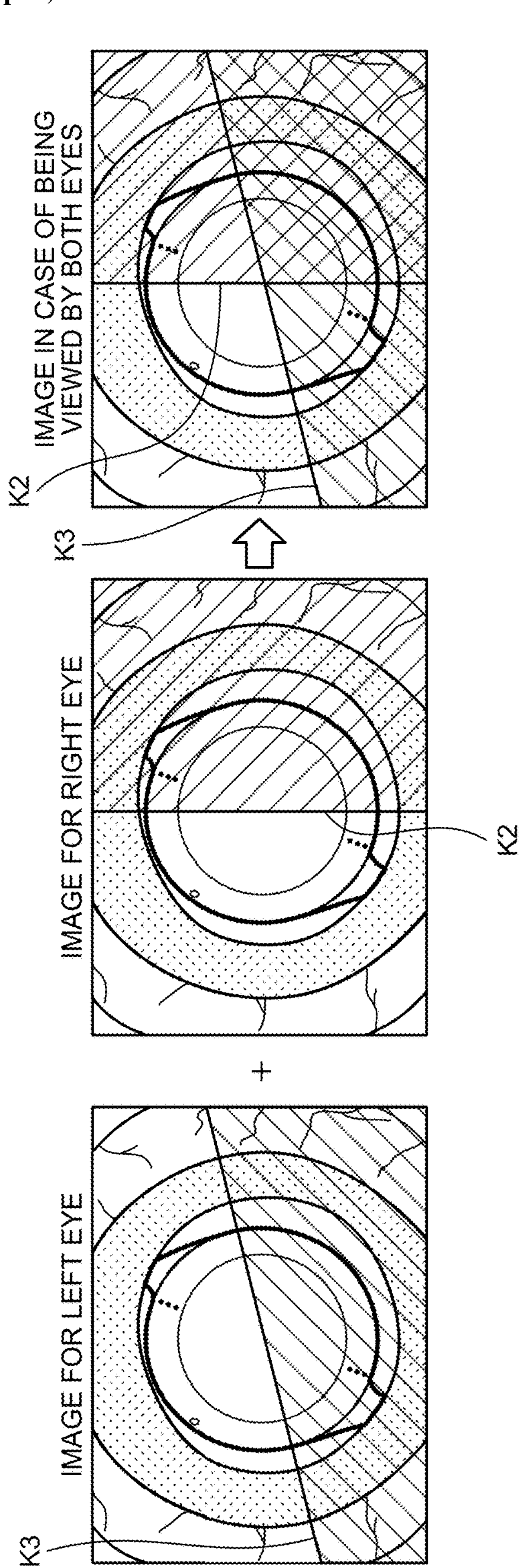
FIG. 16 is a diagram illustrating an example 11 of a display image according to an embodiment of the present disclosure.
Figure 17:
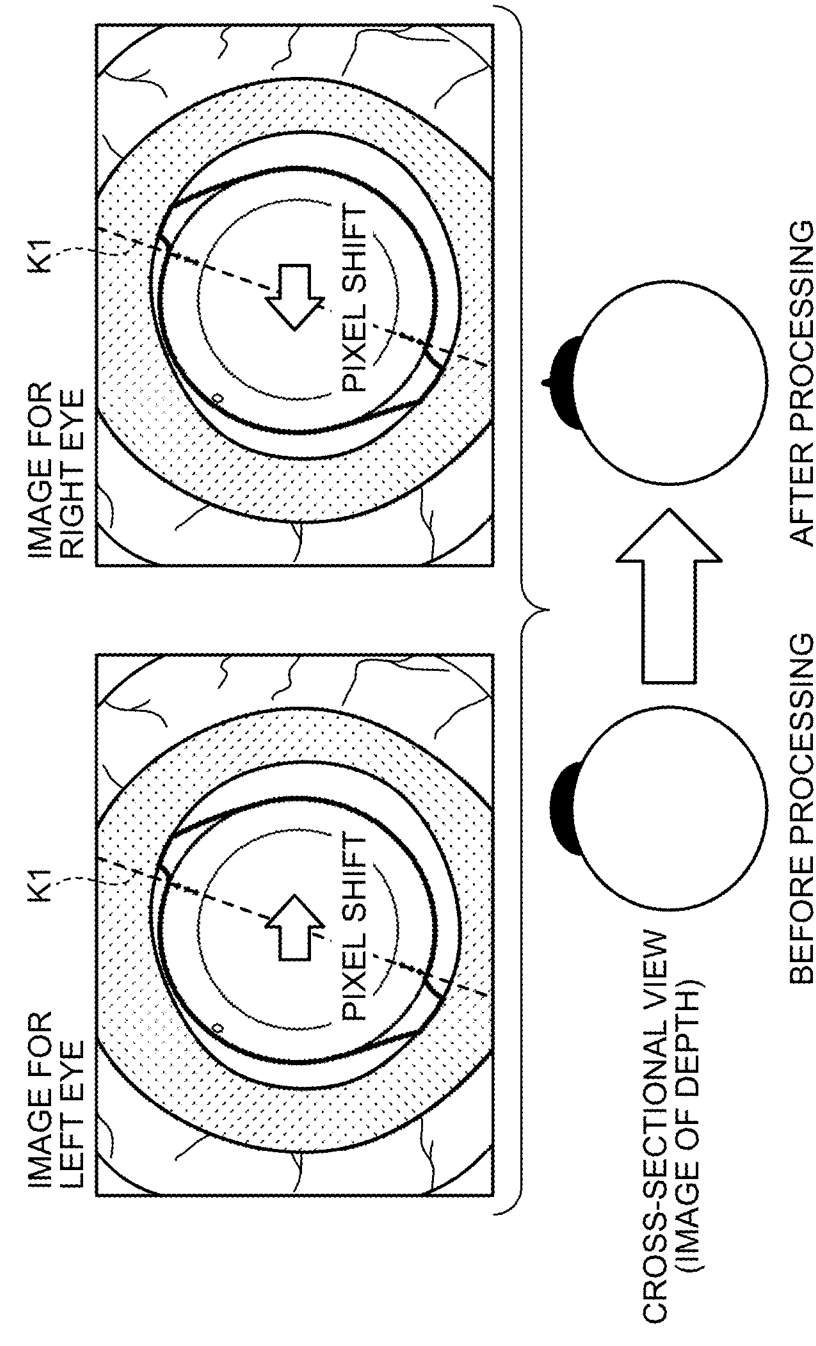
FIG. 17 is a diagram illustrating an example 12 of a display image according to an embodiment of the present disclosure.

Examples 11 and 12 of the display image according to the embodiment will be described with reference to FIGS. 16 and 17. FIGS. 16 and 17 are diagrams illustrating the examples 11 and 12 of the display image according to the embodiment. In the examples 11 and 12, additional points in 3D image (three-dimensional operative field image) presentation will be described. Normally, the 3D image is often used in the ophthalmic operation. In this case, an image for a left eye and an image for a right eye exist so that a sense of depth can be presented as a difference in parallax. Therefore, additional points for boundary presentation for the image for the left eye and the image for the right eye will be described.

As illustrated in FIG. 16, regarding the boundary presentation for the 3D image, there are a case where the boundary is presented in both the image for the left eye and the image for the right eye, that is, a boundary K2 is presented in the image for the right eye and a boundary K3 is presented in the image for the left eye, and a case where the boundaries K2 and K3 are presented in only one of the image for the left eye and the image for the right eye (see FIG. 7). Note that, even if the boundaries K2 and K3 are presented only in the image for one eye, the image change from the original image is small, so that there is an advantage that the 3D perception is not substantially affected and the operator can visually recognize the boundaries K2 and K3. Therefore, the boundaries K2 and K3 may be presented only in the image for one eye, or different boundaries (for example, the boundary K2 and the boundary K3) may be presented in the image for the left eye and the image for the right eye.

In the example of FIG. 16, the different boundaries K2 and K3 are presented in the image for the left eye and the image for the right eye (the boundary K2 is presented in the image for the right eye, and the boundary K3 is presented in the image for the left eye), and an intersection of the boundaries K2 and K3 is presented by fusing the boundaries K2 and K3 in a brain. In this way, for example, in order to present a centering position and a wound position, the two boundaries K2 and K3 can be indicated by a crossed position or the like. In addition, it is possible to increase information that can be presented by a combination of various boundaries (for example, the boundary K2 and the boundary K3).

Note that, in a case where the different boundaries K2 and K3 are presented in the image for the left eye and the image for the right eye, the different boundaries K2 and K3 may be presented in the image for the left eye and the image for the right eye on the basis of the information tracked in the image for one eye, and the different boundaries K2 and K3 may be presented in the image for the left eye and the image for the right eye on the basis of the information tracked in the images for both eyes which are the image for the left eye and the image for the right eye.

In addition to presenting the different boundaries K2 and K3 in both the image for the left eye and the image for the right eye, the same boundary (for example, the boundary K1) may be presented in both the image for the left eye and the image for the right eye. In a case where the same boundary is presented in the image for the left eye and the image for the right eye, depth perception occurs with respect to the boundary, so that which position the boundary is localized at may be controlled. For example, if the ophthalmic operation is CCC (anterior capsulotomy of a crystalline lens), the boundary is localized at the position of the anterior capsule.

As illustrated in FIG. 17, for the boundary K1, processing of creating a depth gap in the 3D image may be performed. In the example of FIG. 17, as the image processing, pixels of the image for the left eye are shifted to the right, and pixels of the image for the right eye are shifted to the left. After the processing (after parallax modulation), since the parallax changes, the fixed position in the depth changes. The operator feels that the boundary K1 protrudes forward. As a result, the operator can easily grasp the position of the boundary K1, so that the ophthalmic operation can be accurately performed.

Note that, in a case where the intensity of image processing (for example, a degree of modulation and the like) is small, even if processing is applied only to the image of one eye or different processing is applied to individual images of both eyes, flickering does not occur and parallax does not occur, unlike mark superimposition or the like. Therefore, there is no conflict between the operative field and the depth. Furthermore, in a case where the same processing is applied to the individual images of both eyes, it is possible to perform localization at a desired specific depth position by generating the parallax, and it is also possible to perform localization at a position to be treated by the user according to the guide.

(Change in Boundary Presentation)

Figure 18:
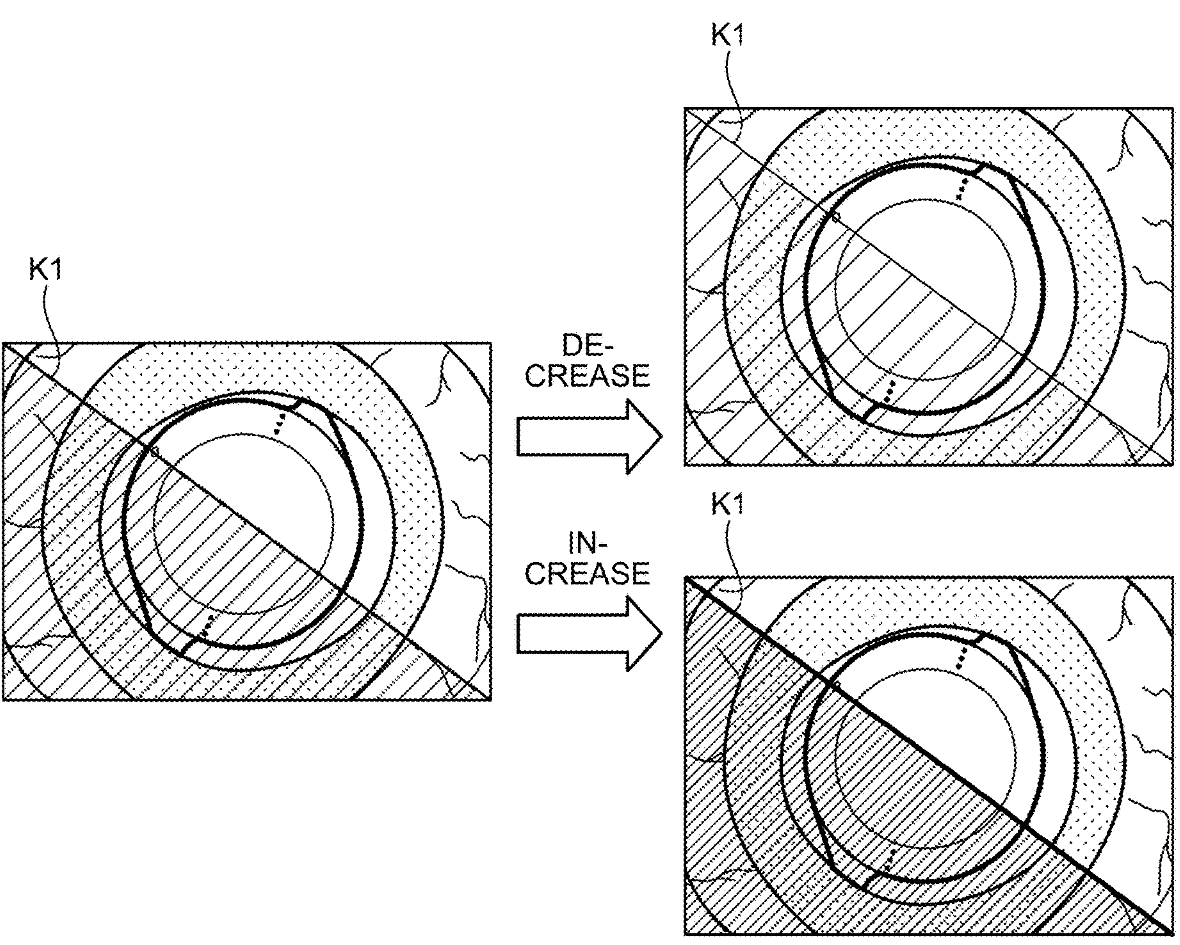
FIG. 18 is a diagram illustrating a change in boundary presentation according to a tracking status according to an embodiment of the present disclosure.
Figure 19:
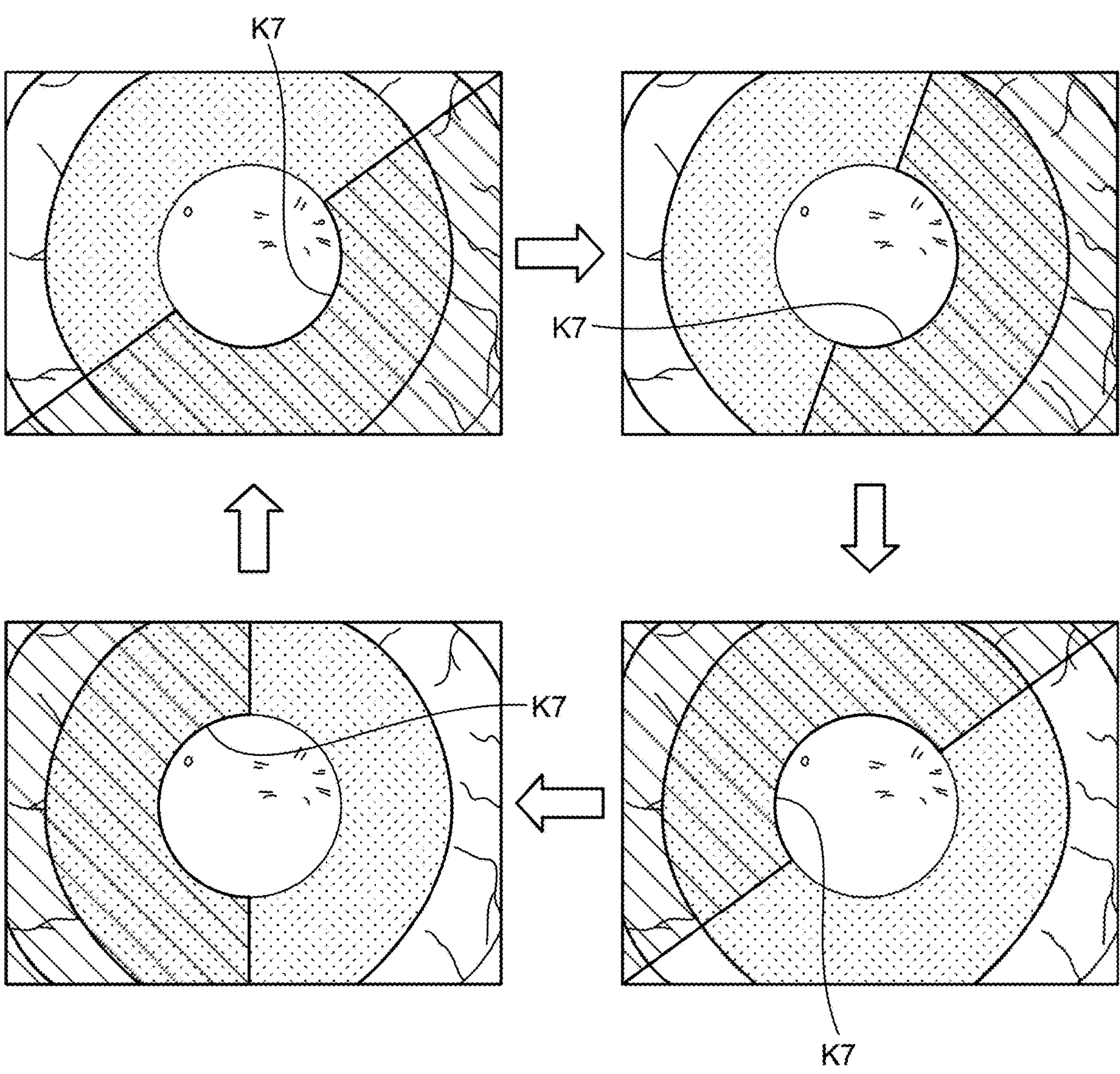
FIG. 19 is a first diagram illustrating a change in boundary presentation according to a time according to an embodiment of the present disclosure.
Figure 20:
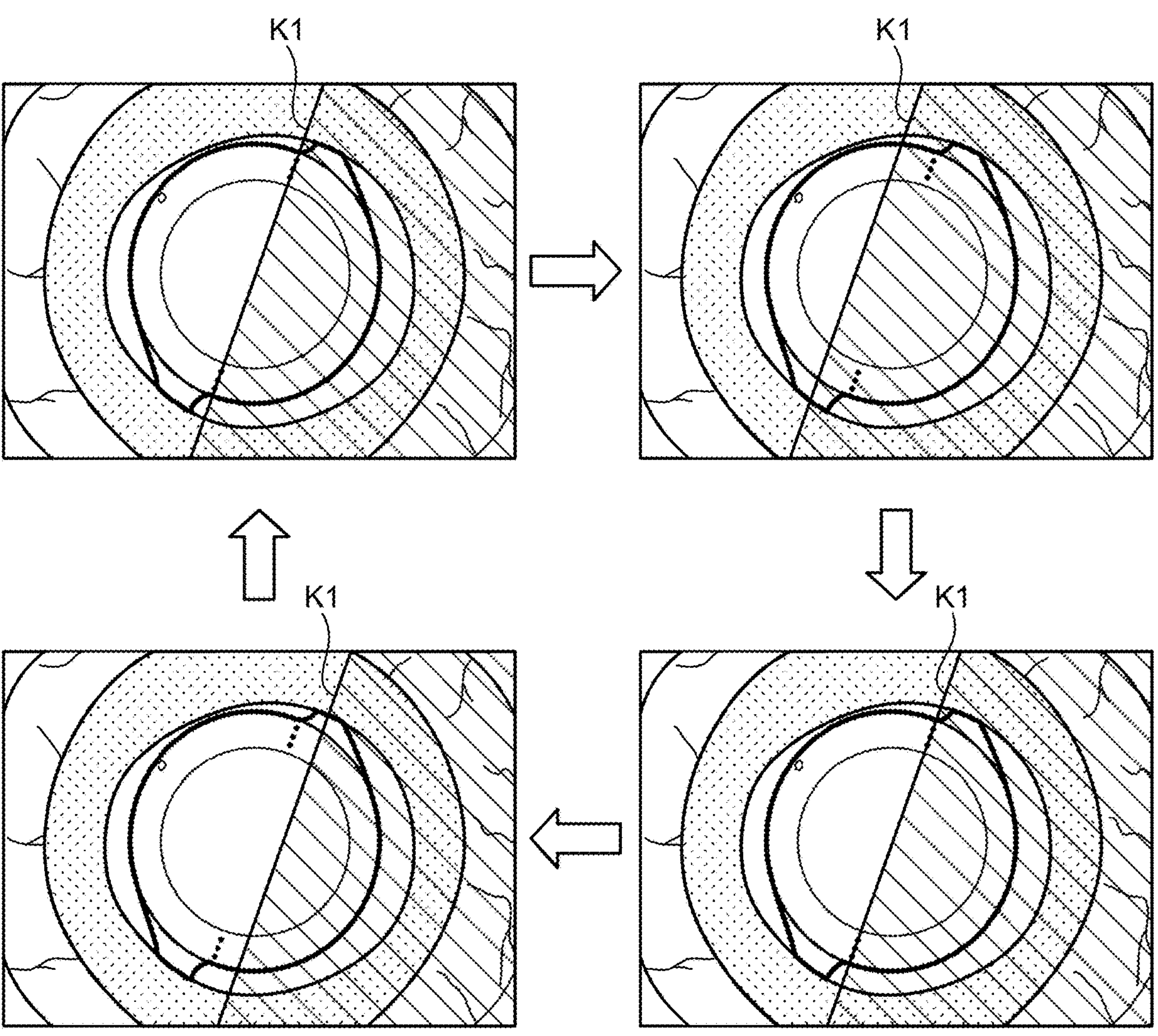
FIG. 20 is a second diagram illustrating a change in boundary presentation according to a time according to an embodiment of the present disclosure.
Figure 21:
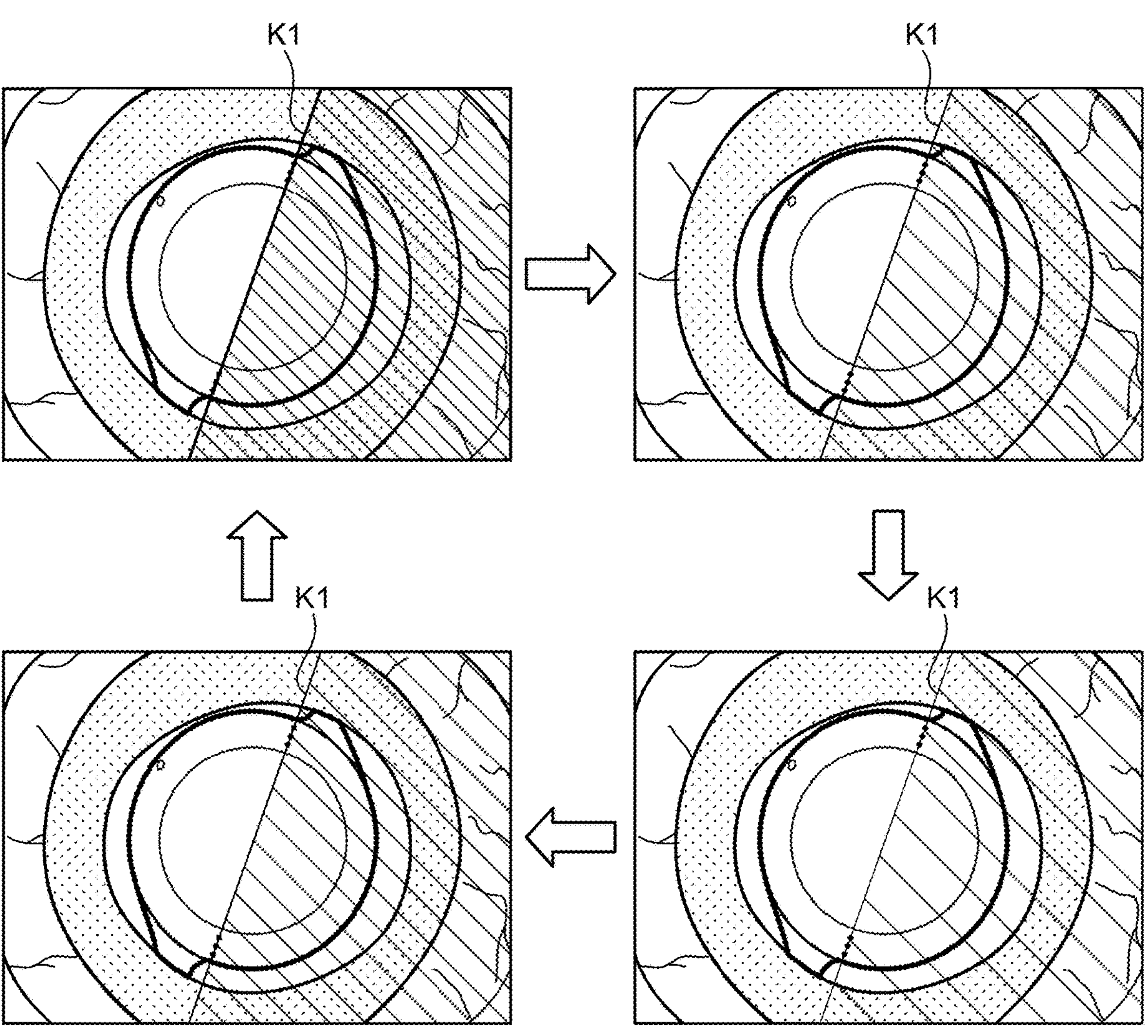
FIG. 21 is a third diagram illustrating a change in boundary presentation according to a time according to an embodiment of the present disclosure.
Figure 22:
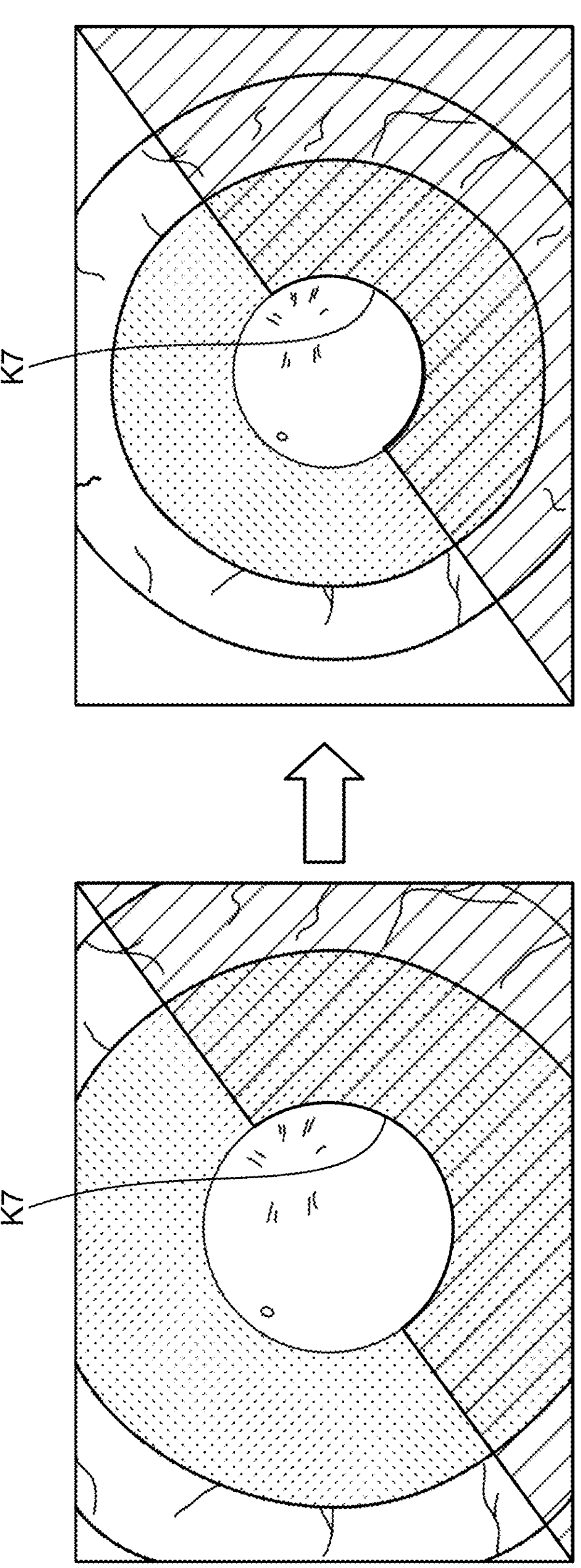
FIG. 22 is a diagram illustrating a change in boundary presentation according to a tracking result according to an embodiment of the present disclosure.

An additional point in the change in the boundary presentation according to the tracking status or time according to the embodiment will be described. First, the change in the boundary presentation according to the tracking status will be described with reference to FIG. 18. Next, the change in the boundary presentation according to the time will be described with reference to FIGS. 19 to 21. The change in the boundary presentation according to a tracking result (change in the size of the eye) will be described with reference to FIG. 22. FIG. 18 is a diagram illustrating the change in the boundary presentation according to the tracking status according to the embodiment. FIGS. 19 to 21 are first to third diagrams illustrating the change in the boundary presentation according to the time according to the embodiment. FIG. 22 is a diagram illustrating the change in the boundary presentation according to the tracking result according to the embodiment.

In the principle of eyeball tracking, when the amount of eyeball appearing in the operative field decreases, tracking accuracy is deteriorated. In addition, a detection limit of tracking may be set in order to maintain the tracking accuracy. That is, there may be a situation where there is confidence in the tracking accuracy or a situation where tracking approaches the tracking detection limit. In such a case, as illustrated in FIG. 18, the intensity of processing (for example, the degree of modulation and the like) of a predetermined region may be decreased to bring an image of the predetermined region close to the original image, or the intensity of processing of the predetermined region may be increased to make the image of the predetermined region conspicuous as warning (warning information). Of course, a message may be overlaid and presented at a fixed position on the display screen together with them. In this way, by presenting the above-described tracking status to the user such as the operator, the user can grasp the reliability of tracking.

Further, in the information presentation based on the boundaries K1 to K7 of the respective regions, occlusion (shielding) of the operative field does not occur in principle, but there is a possibility that the operator may feel a slight decrease in visibility on the boundaries K1 to K7. Therefore, as illustrated in FIGS. 19 and 20, the positions of the boundaries K1 to K7 that present the same information (specific position) may be changed.

In the example of FIG. 19, the boundary K7 rotates by 360 degrees about the eye axis or the like. For example, in an operation such as anterior capsulotomy, the boundary K7 rotates at a predetermined speed (for example, a speed higher than a speed when the operator moves a distal end of an operation tool) from the start of the operation. This rotation is repeated during the operation. Accordingly, the boundary K7 forms a target circle for the anterior capsulotomy. In this way, it is possible to improve the visibility by changing the position of the boundary K7 that presents the same information.

Here, the predetermined speed is set in advance, and is, for example, a value larger than a general value such as an average value of speeds when the operator moves the distal end of the operation tool. However, the rotation speed of the boundary K7 may not be the predetermined speed, and for example, the boundary K7 may be rotated according to the movement of the operation tool or the movement of the end point of the anterior capsulotomy edge by detecting the distal end of the operation tool or the end point of the anterior capsulotomy edge moved by the operator. Furthermore, a rotation angle of the boundary K7 may be, for example, another angle such as 180 degrees.

In the example of FIG. 20, the boundary K1 moves in parallel at a predetermined speed. The boundary K1 moves leftward from the reference position by a predetermined distance, returns from the left predetermined position to the reference position, further moves rightward from the reference position by a predetermined distance, and returns from the right predetermined position to the reference position. This movement is repeated during the operation (periodic movement). As a result, it is possible to improve visibility by changing the position of the boundary K1 that presents the same information.

Further, as illustrated in FIG. 21, the visibility may be improved by periodically decreasing the intensity of processing (for example, the degree of modulation and the like) of the predetermined region. In the example of FIG. 21, the intensity of processing is gradually decreased from an initial state, and then gradually increased, and is returned to the initial state again. As described above, by periodically decreasing the intensity of processing of the predetermined region (the degree of image change from the original image), the visibility can be improved.

As such, by periodically decreasing the intensity of processing of the predetermined region (the degree of image change from the original image), the visibility of the operative field can be further improved. In addition, by periodically shifting the presentation position of the boundary K1 such as the toric axis, it is possible to avoid that the boundary K1 overlaps the mark B1*a* (see FIG. 4) of the toric IOL and the mark B1*a* becomes difficult to view. In addition, since the tracking accuracy is likely to decrease when the position of the cornea to be tracked comes to the end, it is possible to enhance the visibility of the operative field or to make the user aware of bringing the cornea to the center portion with high tracking accuracy by decreasing the intensity of the processing of the predetermined region.

Note that, as described above, the positions of the boundaries K1 and K7 may be changed with a predetermined period, or may be switched in accordance with an instruction of the user. For example, the user can switch the positions of the boundaries K1 and K7 by operating an operation unit such as a touch panel, a foot switch, or a controller.

Further, image processing may be performed on the predetermined region as described above, or the operation unit (for example, the distal end of the operation tool or the like) such as the operation tool operated by the operator may be detected, and image processing (for example, luminance modulation processing, color modulation processing, and the like) may be performed on a region not including the operation unit.

Further, as illustrated in FIG. 22, the position and the size of the boundary K7 may be changed according to a change in the size of the eye. Since a part of the boundary K7 has a semicircular shape and indicates the size of the eye, the position of the boundary K7 changes according to a change in the size of the eye. For example, when the size of the eye in the operative field image decreases, the semicircular size of the boundary K7 also decreases, and the position of the boundary K7 approaches the center. Conversely, when the size of the eye in the operative field image increases, the semicircular size of the boundary K7 also increases, and the position of the boundary K7 is separated from the center. Examples of the size include the diameter of CCC, the incision width of the wound, and centration.

Examples 13 to 17 of Display Image

Examples 13 to 17 of the display image according to the embodiment will be described with reference to FIGS. 23 to 27. FIGS. 23 to 27 are diagrams illustrating the examples 13 to 17 of the display image according to the embodiment.

Figure 23:
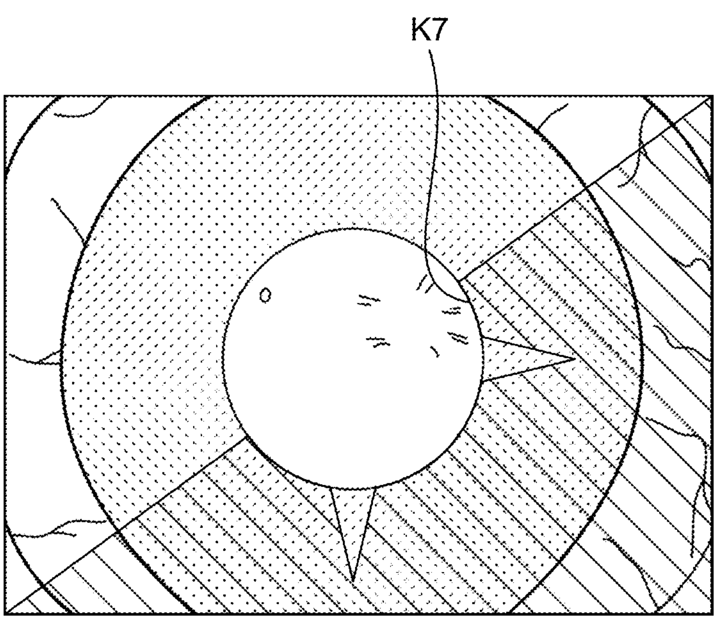
FIG. 23 is a diagram illustrating an example 13 of a display image according to an embodiment of the present disclosure.

As illustrated in FIG. 23, a boundary K7 presents two specific positions in the display image. In the example of FIG. 23, each of the two specific positions indicates wound information (for example, a wound creation position or the like). For example, a part of the boundary K7 is formed in a triangular shape, and the vicinity of a vertex thereof is the wound creation position. In the example of FIG. 23, a region on the right of the boundary K7 in the operative field image is processed.

Figure 24:
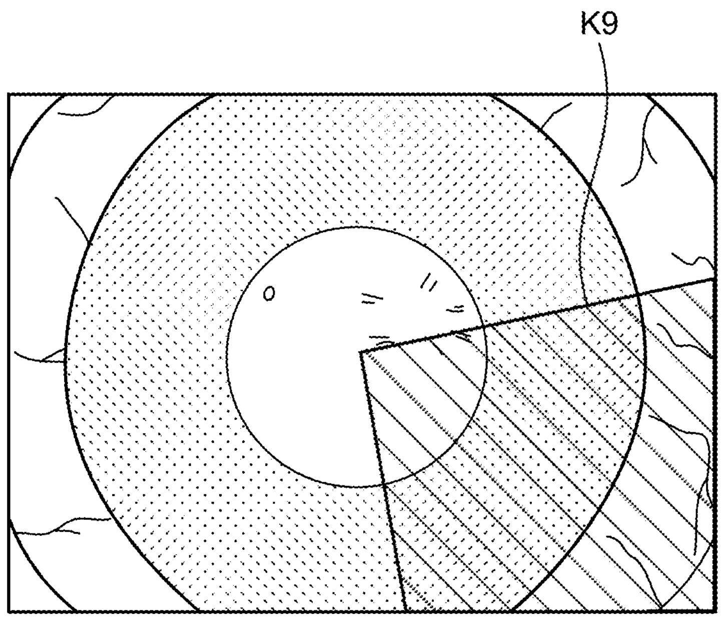
FIG. 24 is a diagram illustrating an example 14 of a display image according to an embodiment of the present disclosure.

As illustrated in FIG. 24, a boundary K9 presents two specific positions in the display image. In the example of FIG. 24, the boundary K9 is radial, and each of the two specific positions indicates wound information (for example, the wound creation position and the like). For example, the vicinity where a boundary line from the corneal center intersects a corneal limbus is the wound creation position. In the example of FIG. 24, a region on the right of the boundary K9 in the operative field image is processed.

Figure 25:
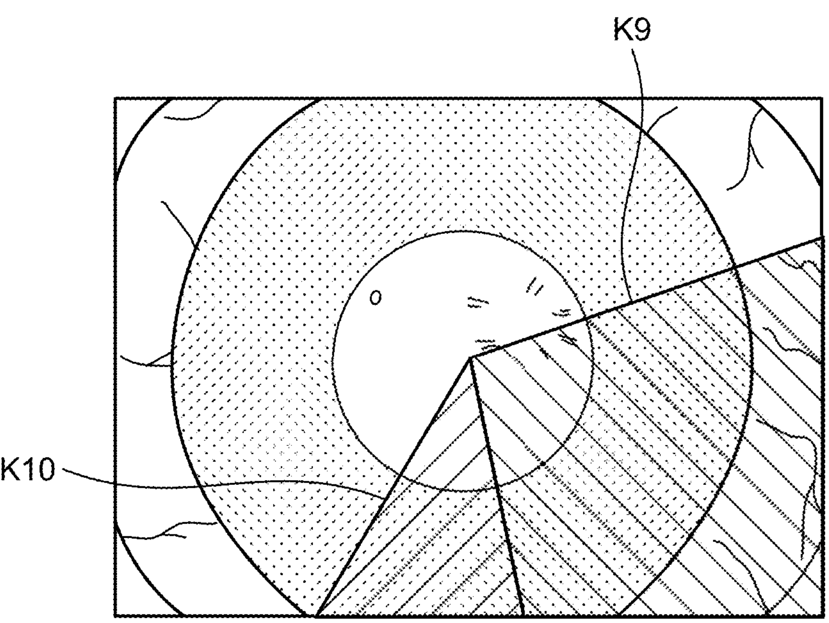
FIG. 25 is a diagram illustrating an example 15 of a display image according to an embodiment of the present disclosure.

As illustrated in FIG. 25, in the display image, a boundary K9 presents three specific positions, and a boundary K10 presents one specific position. In the example of FIG. 25, the boundary K9 is radial, and each of the three specific positions indicates wound information (for example, the wound creation position and the like). For example, the vicinity where a boundary line from the corneal center intersects a corneal limbus is the wound creation position. In the example of FIG. 25, regions on the right of the boundary K9 and the boundary K10 in the operative field image are processed.

Figure 26:
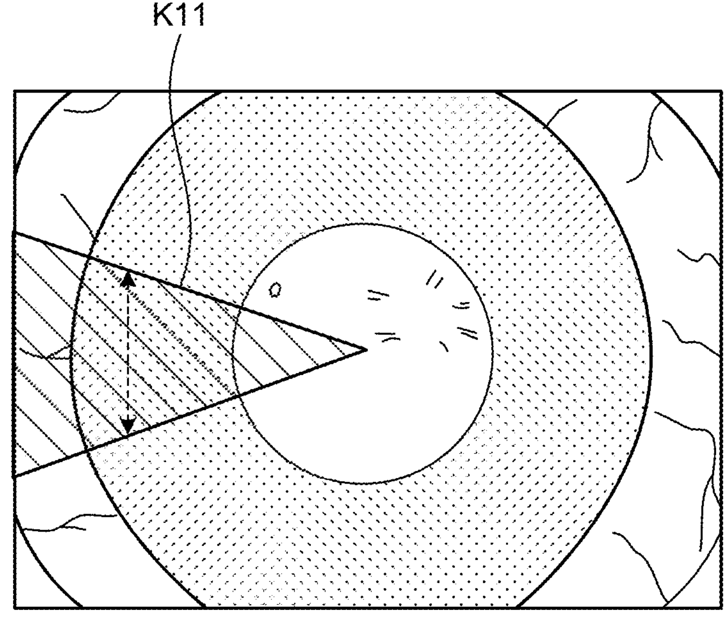
FIG. 26 is a diagram illustrating an example 16 of a display image according to an embodiment of the present disclosure.

As illustrated in FIG. 26, a boundary K11 presents the width and the position of the main wound in the display image. In the example of FIG. 26, the boundary K11 indicates the incision width that is the width on the corneal limbus of the triangle made from the corneal center. The position of the main wound, that is, the position of the incision is a virtual perpendicular bisector of a triangle. In the example of FIG. 26, a region on the left of the boundary K11 in the operative field image is processed.

Figure 27:
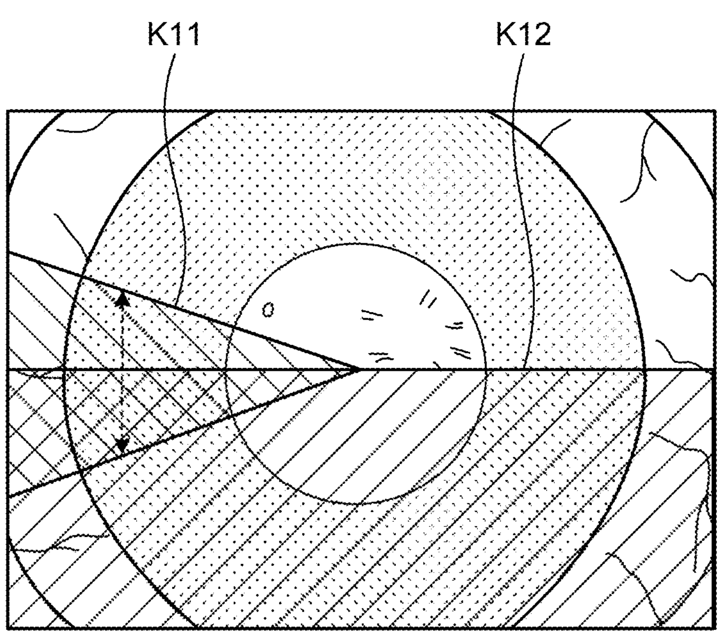
FIG. 27 is a diagram illustrating an example 17 of a display image according to an embodiment of the present disclosure.

As illustrated in FIG. 27, in the display image, a boundary K11 presents the width of the main wound and a boundary K12 presents the position of the main wound. In the example of FIG. 27, the boundary K11 indicates the incision width that is the width on the corneal limbus of the triangle made from the corneal center. The boundary K12 indicates the position of the main wound, that is, a virtual perpendicular bisector of a triangle. In the example of FIG. 27, a region on the left of the boundary K11 in the operative field image is processed, and a region below the boundary K12 is processed. Note that the image for the left eye including the boundary K11 and the image for the right eye including the boundary K12 may be presented, and the boundaries K11 and K12 may be fused in the brain to realize a 3D image (see FIG. 16).

(Change in Boundary Presentation)

Figure 28:
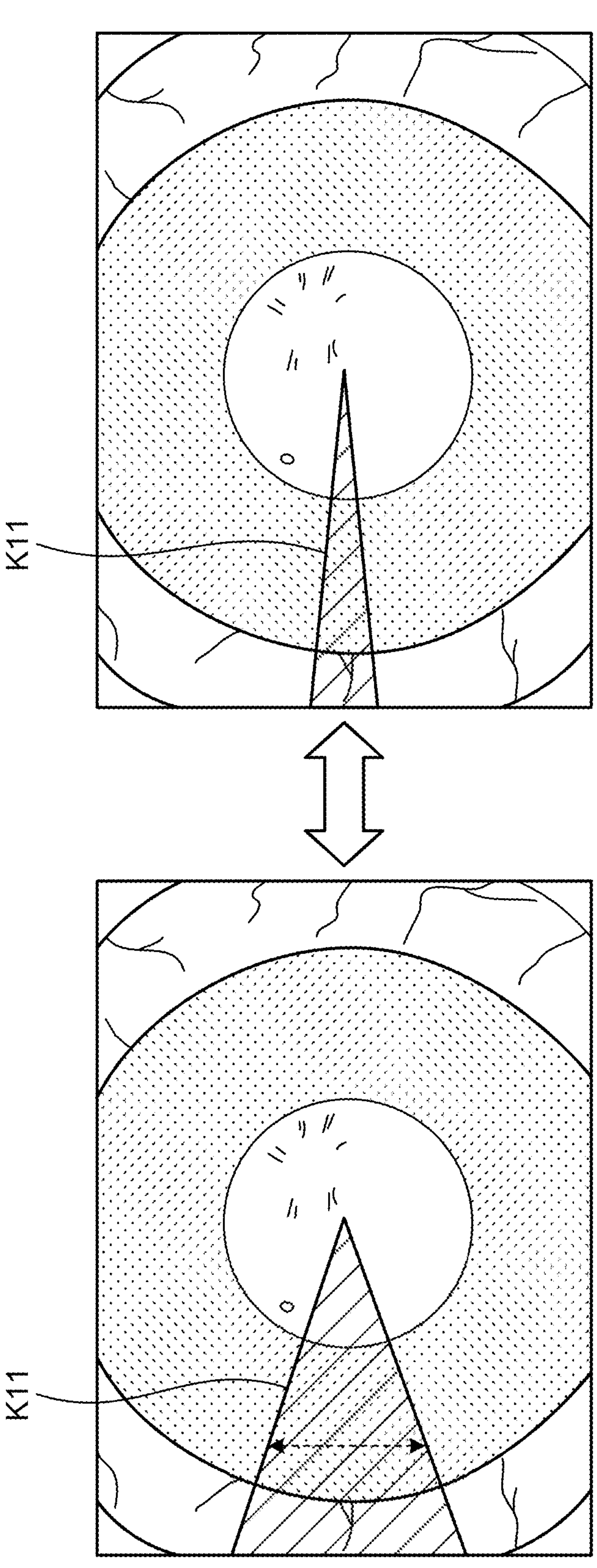
FIG. 28 is a fourth diagram illustrating a change in boundary presentation according to a time according to an embodiment of the present disclosure.

A change in boundary presentation according to a time according to the embodiment will be described with reference to FIG. 28. FIG. 28 is a fourth diagram illustrating the change in the boundary presentation with the time according to the embodiment.

As illustrated in FIG. 28, the width and the position of the boundary K11 may be periodically changed in the display image. For example, when the width of the boundary K11 (the size of the region within the boundary K11) becomes maximum, the desired incision width is set, and the width of the boundary K11 is narrowed in order to know the position of the incision. That is, if the width of the incision is merely indicated by the width in the corneal limbus, the position of the incision may be difficult to understand. Therefore, the width of the boundary K11 may be changed periodically to narrow the width of the boundary K11, and the position of the incision may be indicated.

<Luminance Region>

Here, examples 18 to 20 of a display image in a case where boundaries M3 to M5 are indicated by a plurality of luminance regions having different luminances will be described.

Example 18 of Display Image

Figure 29:
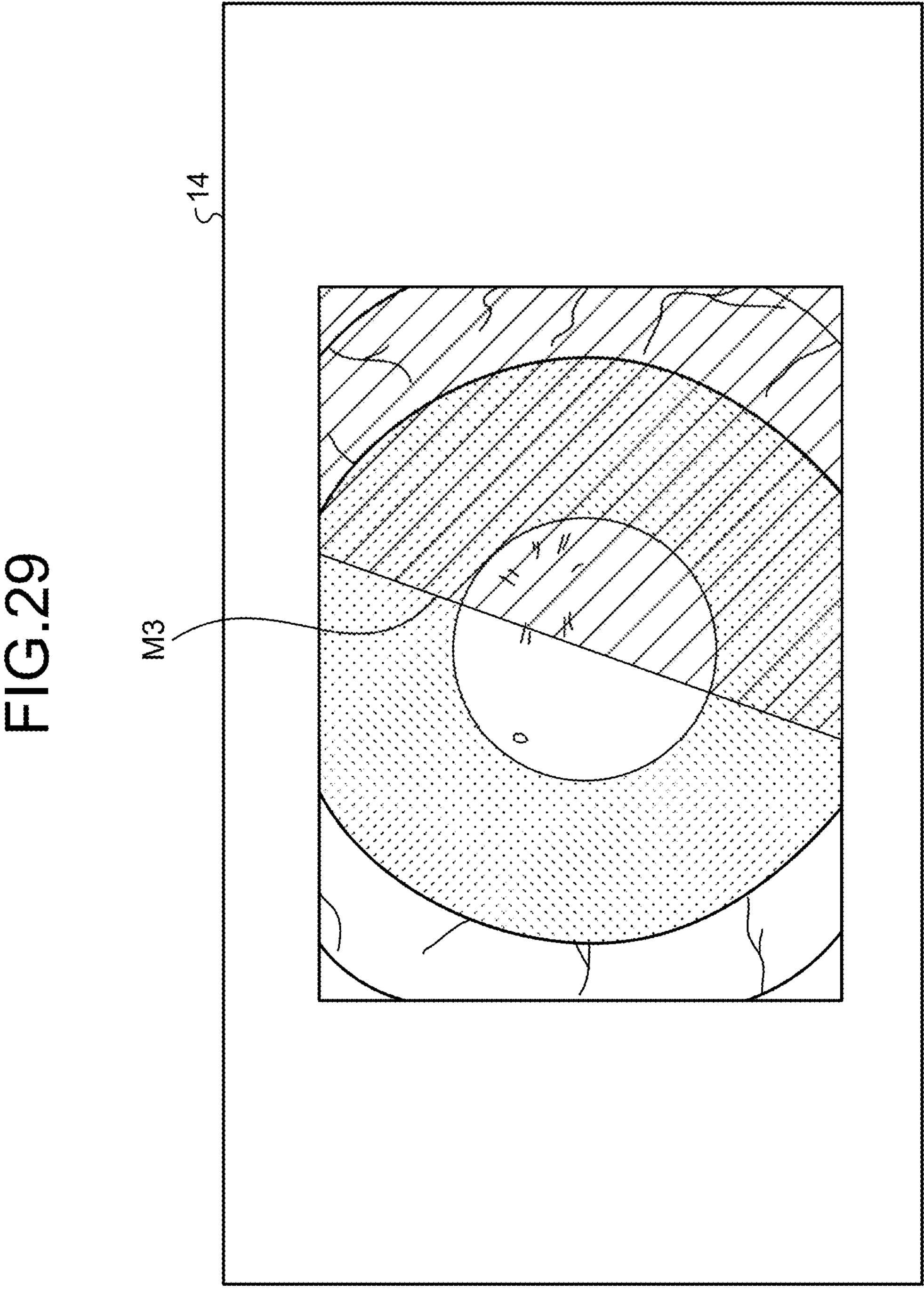
FIG. 29 is a diagram illustrating an example 18 of a display image according to an embodiment of the present disclosure.

FIG. 29 is a diagram illustrating an example 18 of the display image according to the embodiment. As illustrated in FIG. 29, two luminance regions having different luminances are set, and a boundary M3 of these luminance regions is presented. The boundary M3 functions as a boundary of a line shape, that is, a line boundary (target line for installing the intraocular lens B1). In the example of FIG. 29, the luminance of the right luminance region (shaded region in FIG. 29) of the two luminance regions is set to be lower than the luminance of the left luminance region. The toric axis is aligned with the boundary M3, and the toric IOL is installed. Note that the number of luminance regions is not limited to two, and may be two or more.

Example 19 of Display Image

Figure 30:
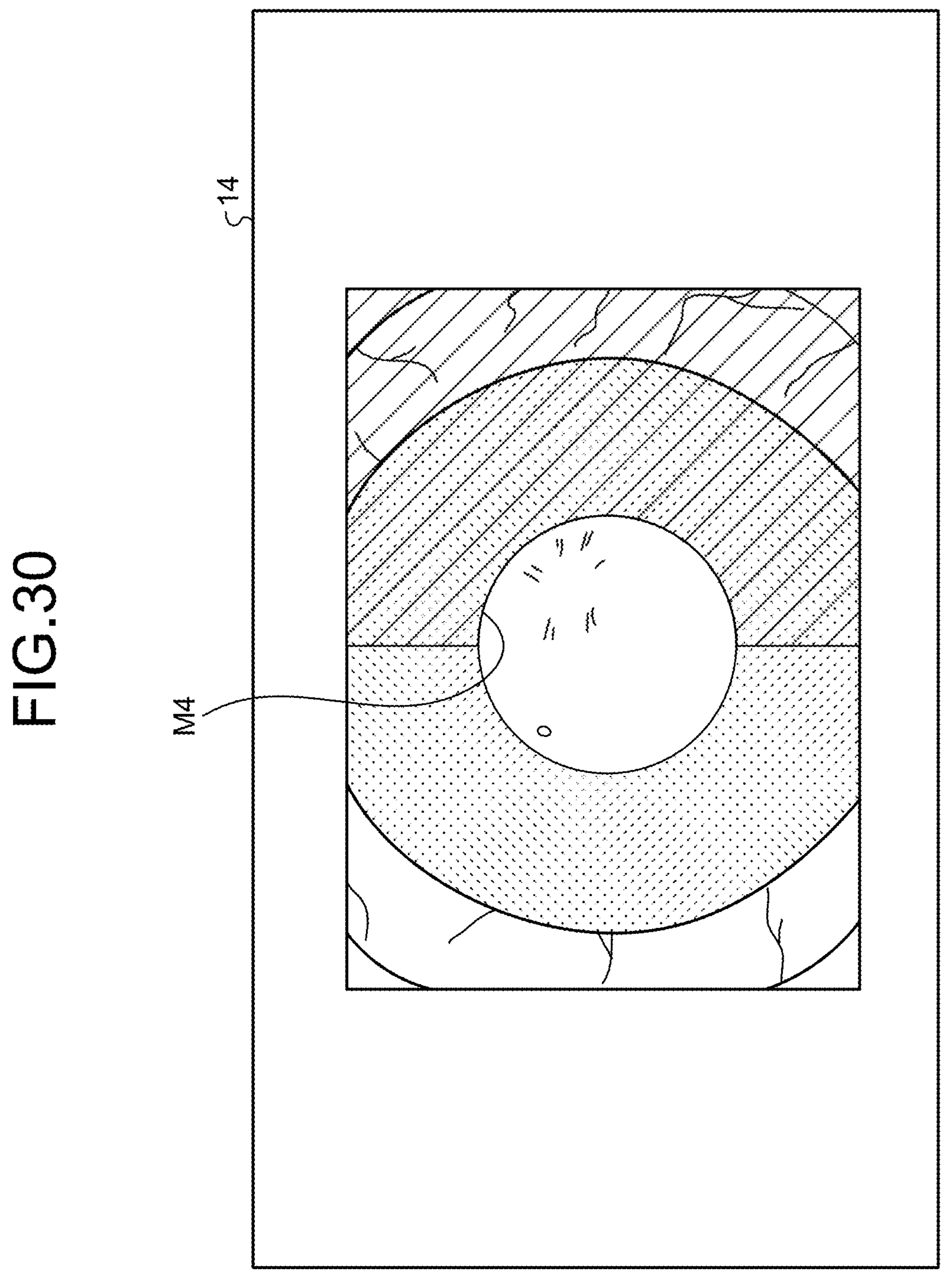
FIG. 30 is a first diagram illustrating an example 19 of a display image according to an embodiment of the present disclosure.
Figure 31:
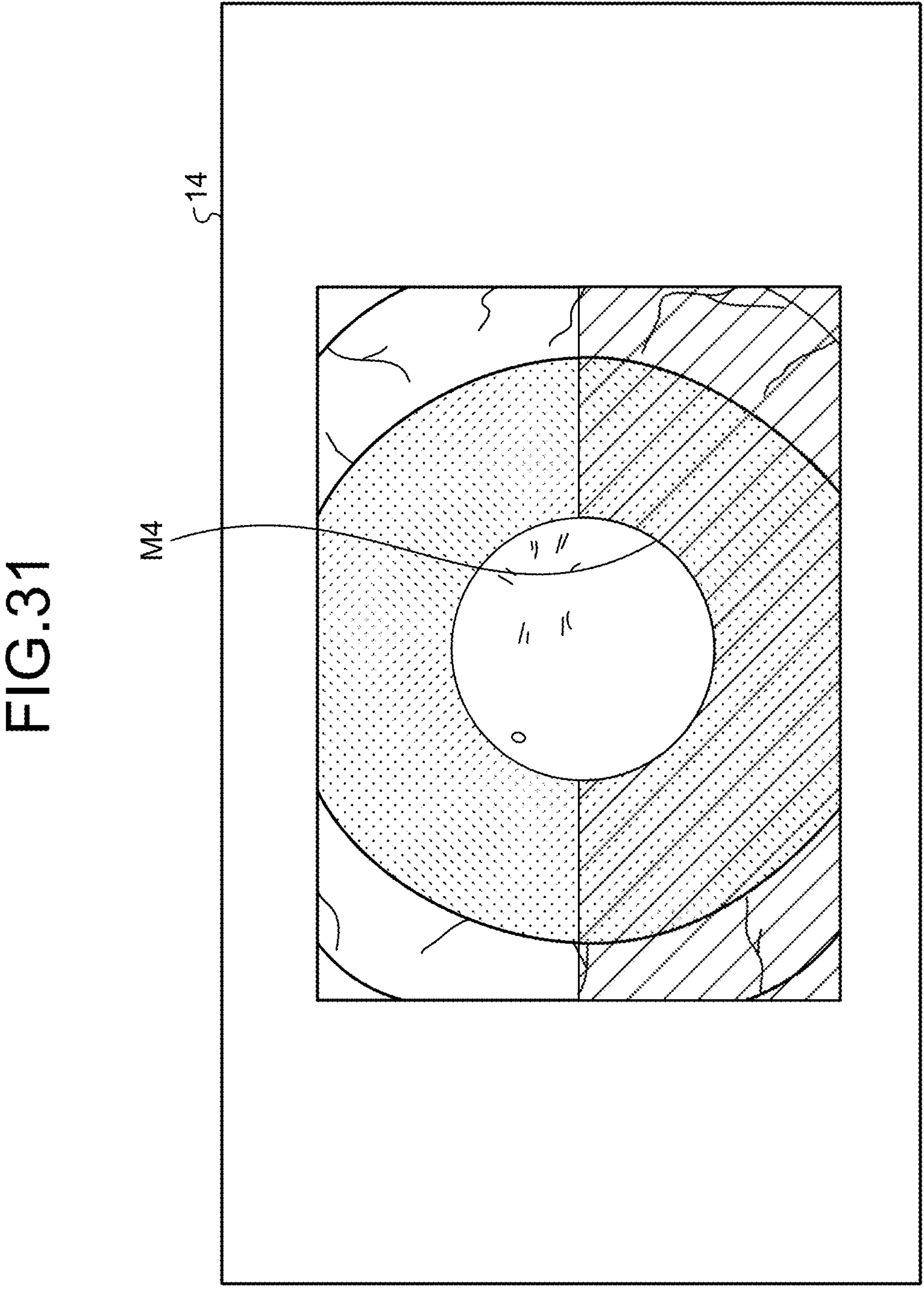
FIG. 31 is a second diagram illustrating the example 19 of the display image according to the embodiment of the present disclosure.

FIGS. 30 and 31 are diagrams illustrating an example 19 of the display image according to the embodiment. As illustrated in FIGS. 30 and 31, two luminance regions having different luminances are set, and are presented as a boundary M4 between the luminance regions. The boundary M4 functions as a boundary of a shape having a semicircle, that is, a semicircle boundary (semicircle for forming a target circle for anterior capsulotomy). In the examples of FIGS. 30 and 31, the boundary M4 of the luminance region is rotated by 90 degrees about the eye axis or the like.

For example, in an operation such as anterior capsulotomy, the boundary M4 of the luminance region rotates by 360 degrees about the eye axis or the like at a predetermined speed (for example, the speed when the operator moves the distal end of the operation tool) from the start of the operation. As a result, the boundary M4 forms a target circle for the anterior capsulotomy. The predetermined speed is set in advance, and is, for example, a general value such as an average value of speeds when the operator moves the distal end of the operation tool. However, the rotation speed of the boundary M4 may not be the predetermined speed, and for example, the boundary M4 may be rotated according to the movement of the operation tool or the movement of the end point of the anterior capsulotomy edge by detecting the distal end of the operation tool or the end point of the anterior capsulotomy edge moved by the operator. A processing start portion 13*g* to be described later can be used to detect the distal end of the operation tool and the end point of the anterior capsulotomy edge. Further, the rotation angle of the boundary M4 may be, for example, another angle such as 180 degrees.

Example 20 of Display Image

Figure 32:
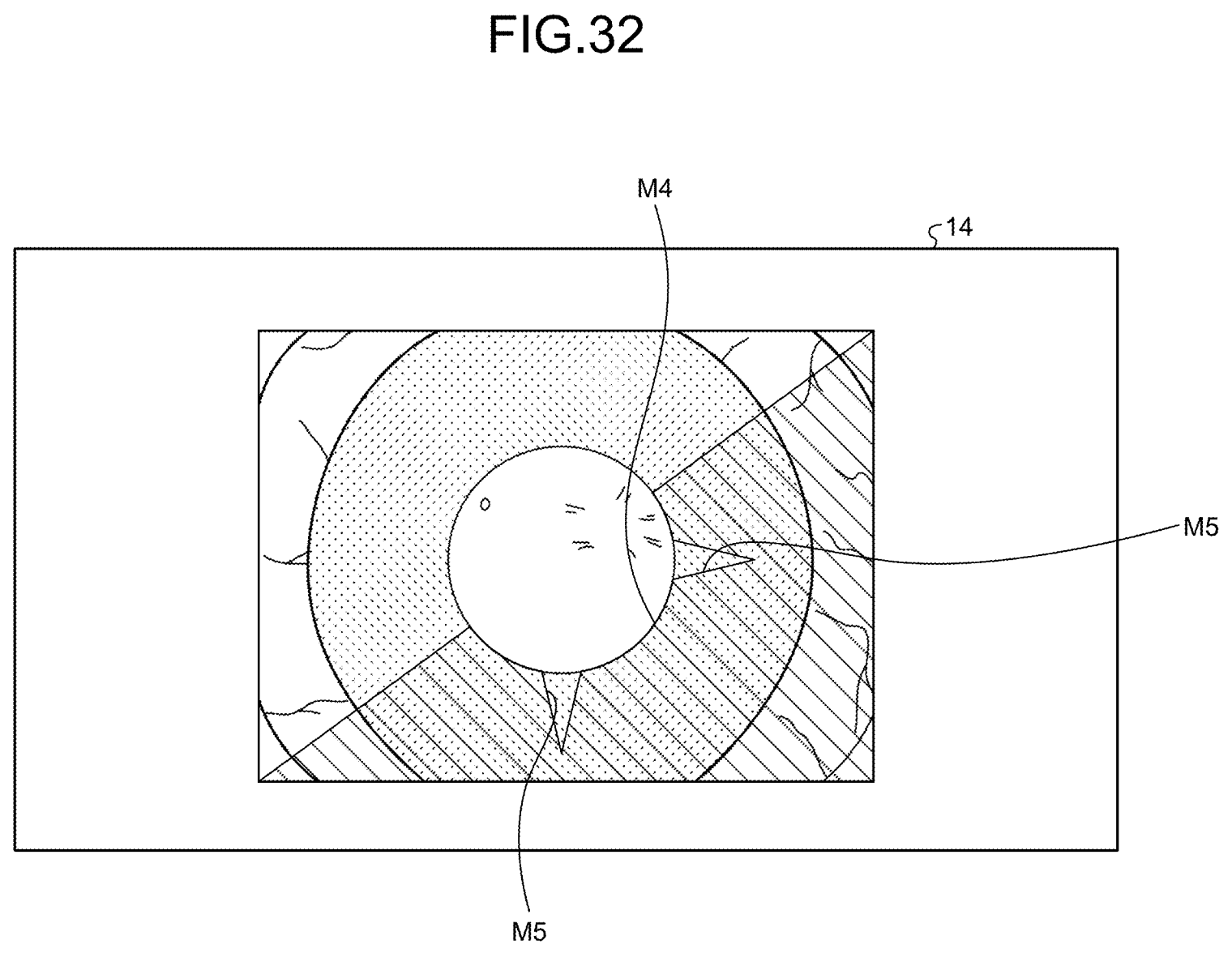

FIG. 32 is a diagram illustrating an example 20 of the display image according to the embodiment. As illustrated in FIG. 32, in addition to the boundary M4 illustrated in FIGS. 30 and 31, a plurality of (two in the example of FIG. 32) boundaries M5 are further presented. Similarly to the example 10 of the display image, the boundary M4 and the boundary M5 are formed by boundaries of two luminance regions having different luminances. The boundary M5 is a boundary indicating the incision position.

As described above, as clear from the above description, the boundaries K1 to K12 and M3 to M5 are not marks superimposed and displayed on the operative field image, but are boundaries that can indicate the posture (the position, the direction, the size, and the like) for visual recognition. Since the boundaries K1 to K12 and M3 to M5 do not hide the operative field image at the position of the mark unlike the superimposed mark, an effect of improving the visibility of the operative field can be obtained as compared with the case of using the superimposed mark.

Further, as described above, the operative field image may be fixed, and the postures of the boundaries K1 to K12 and M3 to M5 may be changed so that the boundaries K1 to K12 and M3 to M5 become appropriate postures (positions, directions, and the like) with respect to the fixedly presented operative field image (for example, the displacements of the boundaries K1 to K12 and M3 to M5 with respect to the eyeball in the operative field image in the fixed posture are eliminated.). Changing the postures of the boundaries K1 to K12 and M3 to M5 changes the range (for example, the size, the shape, and the like) of each region.

For example, when the postures of the boundaries K1 to K12 and M3 to M5 are changed, the display image generation unit 13*f* generates the display image while changing the postures of the boundaries K1 to K12 and M3 to M5 according to the displacement of the eyeball on the basis of the posture information of the eyeball. For example, the display image generation unit 13*f* moves the boundaries K1 to K12 and M3 to M5 in the movement direction of the eyeball by the above-described movement amount with respect to the real-time operative field image according to the movement direction and the movement amount of the eyeball, and changes the postures (for example, the range of each region) of the boundaries K1 to K12 and M3 to M5. That is, by fixing the operative field image and changing the postures of the boundaries K1 to K12 and M3 to M5, the positional relation between the eyeball and the boundaries K1 to K12 and M3 to M5 does not change.

Further, the tracking processing may fail, and a time at which the posture (position, direction, or the like) of the eye in the real-time image cannot be estimated may occur. In such a case, the display image generation unit 13*f* may continue the display by maintaining the posture of the image (last display image) at the time when the posture can be estimated last. Note that, in addition to maintaining the posture of the operative field image at the time when the posture can be estimated last, the posture of the operative field image at the time when the posture can be estimated may be maintained by the constant velocity, the constant angular velocity, the constant acceleration motion, or the constant angular acceleration motion. In addition, when the tracking fails, the display mode (for example, the luminance, the color, and the like) of the predetermined region may be changed so that the failure can be recognized.

Although the various display images described above are used, these display images may be selectable by an operator, a staff, or the like. Selection of the display image is realized by an input operation on an operation unit by the operator, the staff, or the like. For example, the operator, the staff, or the like operates the operation unit to select a display mode for displaying a desired display image. In response to this selection, the display image generation unit 13*f* generates a display image on the basis of the selected display mode. Similarly, regarding various images, the size, position, and the like of the image may be changeable by the operator, the staff, or the like. The display image generation unit 13*f* generates a display image by changing the size, position, and the like of the image in accordance with an input operation on the operation unit by the operator, the staff, or the like.

1-4. Functions and Effects

As described above, according to the embodiment, the image input unit 13*b* receives the operative field image for the eye of the patient, the eyeball tracking unit 13*e* tracks the eyeball in the operative field image, the display image generation unit 13*f* sets a plurality of regions having different display modes for the operative field image, generates the display image in which the boundary (for example, the boundaries K1 to K12 and M3 to M5) of each region indicates the specific position or the specific size with respect to the eye, and generates the display image by changing the position or the size of the boundary by coordinate conversion on the basis of the tracking result (tracking result) of the eyeball. This makes it possible to prevent the occurrence of occlusion by presenting the specific position with respect to the eye not by the mark but by the boundary of each region having a different display mode. Therefore, the operator can easily see the operative field image while grasping the specific position or the specific size, and can accurately perform the operation, so that the operation according to the preoperative plan can be realized with high accuracy. Note that the displacement includes any change with respect to a subject such as the eyeball, such as movement in parallel, rotation, enlargement/reduction, deformation, or a combination thereof.

Further, the preoperative plan reception unit 13*a* receives a preoperative image and information of the position or the size of the index (for example, the position, the direction, the size, and the like on the coordinates) based on the preoperative plan for the eye of the patient. The information accumulation unit 13*d* converts the information of the position or the size of the index in accordance with the operative field image at the start of the operation by comparing the preoperative image with the operative field image at the start of the operation, and accumulates the operative field image at the start of the operation and the converted information of the position or the size of the index. The eyeball tracking unit 13*e* tracks the eyeball in the real-time operative field image by comparing the operative field image at the start of the operation with the real-time operative field image, and outputs the relation information indicating the relation between the information of the position or the size of the eyeball in the real-time operative field image (for example, the position, the direction, the size, and the like on the coordinates) and the converted information of the position or the size of the index. The display image generation unit 13*f* arranges the boundary on the basis of the converted information of the position or the size of the index, changes the position or the size of the boundary in the real-time operative field image so as to eliminate a change in the position or the size of the boundary with respect to the eyeball in the operative field image at the start of the operation on the basis of the relation information, and generates the display image. As a result, by changing the positions or the sizes of the boundaries K1 to K7 with respect to the eyeball in the operative field image at the start of the operation, the relation between the positions or sizes of the eyeball and the boundaries K1 to K7 does not change. Therefore, since the operator can grasp the specific position or size in detail, it is possible to realize the operation according to the preoperative plan with higher accuracy.

Further, the display image generation unit 13*f* converts any one of the plurality of regions on the basis of the tracking result of the eyeball, and changes the position or the size of the boundary. As a result, the processing speed can be improved as compared with the case of converting a plurality of regions.

Further, the display image generation unit 13*f* converts a boundary line indicating the boundary on the basis of the tracking result of the eyeball, and changes the position or the size of the boundary. As a result, the processing speed can be improved as compared with the case of converting the region. For example, the boundary line may be two control points (conversion points), but the region requires three or more control points.

Further, the display image generation unit 13*f* processes any or all of the plurality of regions and varies display modes of the plurality of regions. As a result, since the operator can easily visually recognize the boundary of each region, it is possible to realize the operation according to the preoperative plan with high accuracy.

Further, the display image generation unit 13*f* performs processing of adjusting the same parameter (for example, luminance, color, and the like) on two or more of the plurality of regions. By this simple processing, it is possible to easily make the boundary of each region conspicuous. As a result, since the operator can easily visually recognize the boundary of each region, it is possible to realize the operation according to the preoperative plan with high accuracy.

Further, the display image generation unit 13*f* performs processing of adjusting different parameters (for example, luminance, color, and the like) on two or more of the plurality of regions. By this simple processing, it is possible to easily make the boundary of each region conspicuous. As a result, since the operator can easily visually recognize the boundary of each region, it is possible to realize the operation according to the preoperative plan with high accuracy.

Further, the display image generation unit 13*f* decreases the intensity of processing for any or all of the plurality of regions as the distance from the boundary increases. As a result, since it is possible to bring the region away from the boundary close to the original image while maintaining the clarity of the boundary, it is possible to realize the operation according to the preoperative plan with high accuracy.

Further, the display image generation unit 13*f* generates the display image including the boundary as the display image for the left eye or the display image for the right eye. As a result, the processing speed can be improved as compared with a case where the display image including the boundary is generated respectively as the display image for the left eye and the display image for the right eye.

Further, the display image generation unit 13*f* generates the display image including the boundary respectively as the display image for the left eye and the display image for the right eye. As a result, the positional accuracy of the boundary can be improved as compared with a case where the display image including the boundary is generated as the display image for the left eye or the display image for the right eye.

Further, the eyeball tracking unit 13*e* tracks the eyeball in the operative field image for one or both of the left eye and the right eye, and the display image generation unit 13*f* changes the position or the size of the boundary on the basis of the tracking result of the eyeball for one or both of the left eye and the right eye, and generates the display image for the left eye and the display image for the right eye. As a result, in a case where the operative field image for one of the left eye and the right eye is used, the processing speed can be improved as compared with a case where both the operative field images are used. In a case where both the operative field images are used, the positional accuracy of the boundary can be improved as compared with a case where one of the operative field images is used.

Further, the display image generation unit 13*f* sets the boundary at the same position in the display image for the left eye and the display image for the right eye. As a result, since the operator can easily grasp the position of the boundary, it is possible to realize the operation according to the preoperative plan with high accuracy.

Further, the display image generation unit 13*f* sets the boundary at a different position in the display image for the left eye and the display image for the right eye. As a result, since it is possible to indicate various specific positions by a plurality of boundaries, it is possible to realize the operation according to the preoperative plan with high accuracy.

Further, the display image generation unit 13*f* sets the boundary at a different position to indicate one specific position, in the display image for the left eye and the display image for the right eye. As a result, since it is possible to indicate one specific position by a plurality of boundaries, it is possible to realize the operation according to the preoperative plan with high accuracy.

Further, the display image generation unit 13*f* shifts the display image for the left eye and the display image for the right eye on the basis of depth information of desired localization of a three-dimensional image including the display image for the left eye and the display image for the right eye, and generates the three-dimensional image. As a result, since the operator can more easily grasp the position of the boundary, it is possible to realize the operation according to the preoperative plan with high accuracy.

Further, the display image generation unit 13*f* changes the display mode of any or all of the plurality of regions according to the tracking status of the eyeball by the eyeball tracking unit 13*e*. As a result, the display image can be brought close to the original image or the boundary of the display image can be made conspicuous according to the tracking status of the eyeball, so that the operator can grasp the tracking status of the eyeball (for example, reliability of tracking or the like).

Further, in a case where the eyeball deviates from the tracking of the eyeball by the eyeball tracking unit 13*e*, the display image generation unit 13*f* maintains the last display image before the eyeball deviates. As a result, since it is possible to avoid interruption of the operation due to the disappearance of the display image, it is possible to realize the operation according to the preoperative plan with high accuracy.

Further, the display image generation unit 13*f* changes the display mode of any or all of the plurality of regions according to a time period. As a result, periodically, the display image can be brought close to the original image or the boundary of the display image can be made conspicuous. Therefore, since the operator can reliably visually recognize the original image or the boundary, the operation according to the preoperative plan can be realized with high accuracy.

Further, the display image generation unit 13*f* generates a display image in which the boundary indicates a plurality of specific positions. As a result, since it is possible to present more specific positions, it is possible to realize the operation according to the preoperative plan with high accuracy.

Further, the display image generation unit 13*f* changes the size of any or all of the plurality of regions according to the size change of the eyeball. As a result, one or a plurality of region sizes can be changed in accordance with the size of the eyeball, and the position, size, and the like of the boundary can be changed, so that the operation according to the preoperative plan can be realized with high accuracy.

Further, the display image generation unit 13*f* changes the size of any or all of the plurality of regions according to the time period. As a result, since it is possible to periodically change the size of one or a plurality of regions and change the position, size, and the like of the boundary, it is possible to realize the operation according to the preoperative plan with high accuracy. Further, for example, the display image can be brought close to the original image by reducing the region, and the operator can reliably visually recognize the original image, so that the operation according to the preoperative plan can be realized with high accuracy.

2. EXAMPLE OF SCHEMATIC CONFIGURATION OF COMPUTER

The above-described series of processing can be executed by hardware or software. In a case where the series of processing is executed by the software, a program constituting the software is installed in a computer. Here, examples of the computer include a computer incorporated in dedicated hardware, a general-purpose personal computer capable of executing various functions by installing various programs, and the like.

Figure 33:
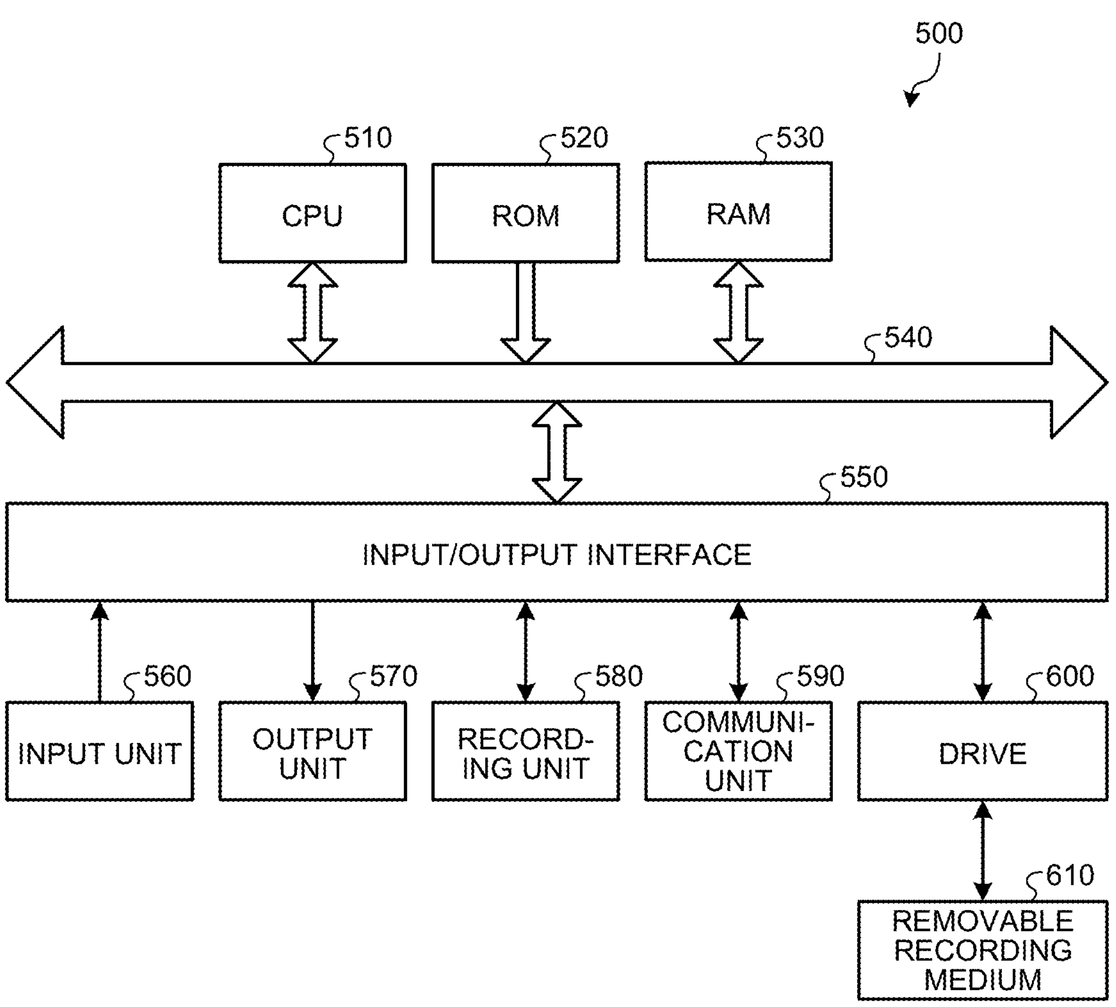
FIG. 33 is a diagram illustrating an example of a schematic configuration of a computer according to an embodiment of the present disclosure.

FIG. 33 is a diagram illustrating an example of a schematic configuration of a computer 500 that executes the above-described series of processing by a program.

As illustrated in FIG. 33, the computer 500 has a central processing unit (CPU) 510, a read only memory (ROM) 520, and a random access memory (RAN) 530.

The CPU 510, the ROM 520, and the RAM 530 are connected to one another by a bus 540. An input/output interface 550 is further connected to the bus 540. An input unit 560, an output unit 570, a recording unit 580, a communication unit 590, and a drive 600 are connected to the input/output interface 550.

The input unit 560 includes a keyboard, a mouse, a microphone, an imaging element, and the like. The output unit 570 includes a display, a speaker, and the like. The recording unit 580 includes a hard disk, a nonvolatile memory, and the like. The communication unit 590 includes a network interface and the like. The drive 600 drives a removable recording medium 610 such as a magnetic disk, an optical disk, a magneto-optical disk, or a semiconductor memory.

In the computer 500 configured as described above, for example, the CPU 510 loads a program recorded in the recording unit 580 into the RAM 530 via the input/output interface 550 and the bus 540 and executes the program, so that the above-described series of processing is performed.

The program executed by the computer 500, that is, the CPU 510 can be provided by being recorded in the removable recording medium 610 as a package medium or the like, for example. Furthermore, the program can be provided via a wired or wireless transmission medium such as a local area network, the Internet, or digital satellite broadcasting.

In the computer 500, the program can be installed in the recording unit 580 via the input/output interface 550 by attaching the removable recording medium 610 to the drive 600. Furthermore, the program can be received by the communication unit 590 via a wired or wireless transmission medium and installed in the recording unit 580. In addition, the program can be installed in the ROM 520 or the recording unit 580 in advance.

Note that the program executed by the computer 500 may be a program in which processing is performed in time series in the order described in the present specification, or may be a program in which processing is performed in parallel or at necessary timing such as when a call is made.

In addition, in the present specification, a system means a set of a plurality of components (devices, modules (parts), and the like), and it does not matter whether or not all the components are in the same housing. Therefore, both a plurality of devices housed in separate housings and connected via a network and one device in which a plurality of modules is housed in one housing are systems.

Furthermore, the embodiments of the present technology are not limited to the above-described embodiments, and various changes can be made without departing from the gist of the present technology.

For example, the present technology can take a configuration of cloud computing in which one function is shared and processed in cooperation by a plurality of devices via a network.

Furthermore, the respective steps described in the above-described processing flow (for example, the flowchart) can be executed by one device or can be shared and executed by a plurality of devices.

Furthermore, in a case where a plurality of processes are included in one step, the plurality of processes included in one step can be executed by one device or can be shared and executed by a plurality of devices.

Furthermore, the effects described in the present specification are merely examples and are not limited, and effects other than those described in the present specification may be provided.

3. NOTES

Note that the present technology can also take the following configurations.

(1)

An image processing apparatus comprising:

an image input unit that receives an operative field image for an eye of a patient;

an eyeball tracking unit that tracks an eyeball in the operative field image; and a display image generation unit that sets a plurality of regions having different display modes for the operative field image and generates a display image in which an annular or radial boundary in the plurality of regions indicates a specific position or a specific size with respect to the eye, wherein the display image generation unit changes a position or a size of the boundary on the basis of a tracking result of the eyeball and generates the display image.

(2)

The image processing apparatus according to (1), wherein the display image generation unit changes the position or the size of the boundary by coordinate conversion on the basis of the tracking result of the eyeball.

(3)

The image processing apparatus according to (1) or (2), wherein the display image generation unit generates the display image in which the boundary indicates a plurality of the specific positions.

(4)

The image processing apparatus according to any one of (1) to (3), further comprising:

a preoperative plan reception unit that receives a preoperative image and information of a position or a size of an index based on a preoperative plan for the eye; and an information accumulation unit that converts information of the position or the size of the index in accordance with the operative field image at a start of an operation by comparing the preoperative image with the operative field image at the start of the operation, and accumulates the operative field image at the start of the operation and the converted information of the position or the size of the index, wherein the eyeball tracking unit tracks the eyeball in the real-time operative field image by comparing the operative field image at the start of the operation with the real-time operative field image, and outputs relation information indicating a relation between information of a position or a size of the eyeball in the real-time operative field image and the converted information of the position or the size of the index, and the display image generation unit arranges the boundary on the basis of the converted information of the position or the size of the index, changes the position or the size of the boundary in the real-time operative field image so as to eliminate a change in the position or the size of the boundary with respect to the eyeball in the operative field image at the start of the operation on the basis of the relation information, and generates the display image.

(5)

The image processing apparatus according to any one of (1) to (4), wherein the display image generation unit converts any one of the plurality of regions on the basis of the tracking result of the eyeball, and changes the position or the size of the boundary.

(6)

The image processing apparatus according to any one of (1) to (4), wherein the display image generation unit converts a boundary line indicating the boundary on the basis of the tracking result of the eyeball, and changes the position or the size of the boundary.

(7)

The image processing apparatus according to any one of (1) to (6), wherein the display image generation unit processes any or all of the plurality of regions and varies individual display modes of the plurality of regions.

(8)

The image processing apparatus according to any one of (1) to (7), wherein the display image generation unit performs processing of adjusting the same parameter for two or more of the plurality of regions.

(9)

The image processing apparatus according to any one of (1) to (7), wherein the display image generation unit performs processing of adjusting different parameters for two or more of the plurality of regions.

(10)

The image processing apparatus according to any one of (1) to (9), wherein the display image generation unit decreases the intensity of processing for any or all of the plurality of regions as a distance from the boundary increases.

(11)

The image processing apparatus according to any one of (1) to (10), wherein the display image generation unit generates the display image as a display image for a left eye or a display image for a right eye.

(12)

The image processing apparatus according to any one of (1) to (10), wherein the display image generation unit generates the display image respectively as a display image for a left eye and a display image for a right eye.

(13)

The image processing apparatus according to (12), wherein the eyeball tracking unit tracks the eyeball in the operative field image for one or both of the left eye and the right eye, and the display image generation unit changes the position or the size of the boundary on the basis of the tracking result of the eyeball for one or both of the left eye and the right eye, and generates the display image for the left eye and the display image for the right eye.

(14)

The image processing apparatus according to (12) or (13), wherein the display image generation unit sets the boundary at the same position in the display image for the left eye and the display image for the right eye.

(15)

The image processing apparatus according to (12) or (13), wherein the display image generation unit sets the boundary at a different position in the display image for the left eye and the display image for the right eye.

(16)

The image processing apparatus according to (15), wherein the display image generation unit sets the boundary at a different position to indicate one specific position, in the display image for the left eye and the display image for the right eye.

(17)

The image processing apparatus according to any one of (12) to (16), wherein the display image generation unit shifts the display image for the left eye and the display image for the right eye on the basis of depth information of desired localization of a three-dimensional image including the display image for the left eye and the display image for the right eye, and generates the three-dimensional image.

(18)

The image processing apparatus according to any one of (1) to (17), wherein the display image generation unit changes a display mode of any or all of the plurality of regions according to a tracking status of the eyeball by the eyeball tracking unit.

(19)

The image processing apparatus according to any one of (1) to (18), wherein when the eyeball deviates from the tracking of the eyeball by the eyeball tracking unit, the display image generation unit maintains the last display image before the eyeball deviates.

(20)

The image processing apparatus according to any one of (1) to (19), wherein the display image generation unit changes a display mode of any or all of the plurality of regions according to a time period.

(21)

The image processing apparatus according to any one of (1) to (20), wherein the display image generation unit changes a size of any or all of the plurality of regions according to a size change of the eyeball.

(22)

The image processing apparatus according to any one of (1) to (21), wherein the display image generation unit changes a size of any or all of the plurality of regions according to a time period.

(23)

An image processing method comprising causing an image processing apparatus to:

receive an operative field image for an eye of a patient;

track an eyeball in the operative field image; and set a plurality of regions having different display modes for the operative field image and generate a display image in which an annular or radial boundary in the plurality of regions indicates a specific position or a specific size with respect to the eye, wherein the image processing apparatus changes a position or a size of the boundary on the basis of a tracking result of the eyeball and generates the display image.

(24)

An operation microscope system comprising:

an operation microscope that obtains an operative field image for an eye of a patient;

an image processing apparatus that generates a display image; and a display device that displays the display image, wherein the image processing apparatus includes:

an image input unit that receives the operative field image;

an eyeball tracking unit that tracks an eyeball in the operative field image; and a display image generation unit that sets a plurality of regions having different display modes for the operative field image, and generates the display image in which an annular or radial boundary in the plurality of regions indicates a specific position or a specific size with respect to the eye, and the display image generation unit changes a position or a size of the boundary on the basis of a tracking result of the eyeball and generates the display image.

(25)

An image processing method using the image processing apparatus according to any one of (1) to (22).

(26)

An operation microscope system including the image processing apparatus according to any one of (1) to (22).

REFERENCE SIGNS LIST

1 OPERATION MICROSCOPE SYSTEM
10 OPERATION MICROSCOPE
11 OBJECTIVE LENS
12 EYEPIECE LENS
13 IMAGE PROCESSING APPARATUS
13A CONTROL UNIT
13*a* PREOPERATIVE PLAN RECEPTION UNIT
13*b* IMAGE INPUT UNIT
13*c* REGISTRATION UNIT
13*d* INFORMATION ACCUMULATION UNIT
13*e* EYEBALL TRACKING UNIT
13*f* DISPLAY IMAGE GENERATION UNIT
14 MONITOR
20 PATIENT BED
51 LIGHT SOURCE
52 OBSERVATION OPTICAL SYSTEM
52*a* HALF MIRROR
53 FRONT IMAGE CAPTURING UNIT
54 TOMOGRAPHIC IMAGE CAPTURING UNIT
55 PRESENTATION UNIT
56 INTERFACE UNIT
57 SPEAKER
500 COMPUTER
510 CPU
520 ROM
530 RAM

540 BUS
550 INPUT/OUTPUT INTERFACE
560 INPUT UNIT
570 OUTPUT UNIT
580 RECORDING UNIT
590 COMMUNICATION UNIT
600 DRIVE
610 REMOVABLE RECORDING MEDIUM

The invention claimed is:

1. An image processing apparatus comprising:
processing circuitry configured to:
receive an operative field image for an eye of a patient;
track an eyeball in the operative field image;
set a plurality of regions of the operative field image, the plurality of regions having different display modes;
generate a display image including the plurality of regions of the operative field image in which an annular or radial boundary formed by the difference in the display modes between the plurality of regions of the operative field image indicates a specific position or a specific size with respect to the eye; and
change a position or a size of the boundary on the basis of a tracking result of the eyeball,
wherein the processing circuitry is configured to generate the display image based upon the changed position or the changed size of the boundary.

2. The image processing apparatus according to claim 1, wherein the processing circuitry is configured to change the position or the size of the boundary by coordinate conversion on the basis of the tracking result of the eyeball.

3. The image processing apparatus according to claim 1, wherein the processing circuitry is configured to generate the display image in which the boundary indicates a plurality of the specific positions.

4. The image processing apparatus according to claim 1, wherein the processing circuitry is configured to:
receive a preoperative image and information of a position or a size of an index based on a preoperative plan for the eye;
convert information of the position or the size of the index in accordance with the operative field image at a start of an operation by comparing the preoperative image with the operative field image at the start of the operation;
accumulate the operative field image at the start of the operation and the converted information of the position or the size of the index;
track the eyeball in the real-time operative field image by comparing the operative field image at the start of the operation with the real-time operative field image;
output relation information indicating a relation between information of a position or a size of the eyeball in the real-time operative field image and the converted information of the position or the size of the index;
arrange the boundary on the basis of the converted information of the position or the size of the index; and
change the position or the size of the boundary in the real-time operative field image so as to eliminate a change in the position or the size of the boundary with respect to the eyeball in the operative field image at the start of the operation on the basis of the relation information.

5. The image processing apparatus according to claim 1, wherein the processing circuitry is configured to:
convert any one of the plurality of regions on the basis of the tracking result of the eyeball, and
change the position or the size of the boundary.

6. The image processing apparatus according to claim 1, wherein the processing circuitry is configured to:
convert a boundary line indicating the boundary on the basis of the tracking result of the eyeball, and
change the position or the size of the boundary.

7. The image processing apparatus according to claim 1, wherein the processing circuitry is configured to:
process any or all of the plurality of regions, and
vary individual display modes of the plurality of regions.

8. The image processing apparatus according to claim 1, wherein the processing circuitry is configured to perform processing of adjusting the same parameter for two or more of the plurality of regions.

9. The image processing apparatus according to claim 1, wherein the processing circuitry is configured to perform processing of adjusting different parameters for two or more of the plurality of regions.

10. The image processing apparatus according to claim 1, wherein the processing circuitry is configured to decrease an intensity of processing for any or all of the plurality of regions as a distance from the boundary increases.

11. The image processing apparatus according to claim 1, wherein the processing circuitry is configured to generate the display image as a display image for a left eye or a display image for a right eye.

12. The image processing apparatus according to claim 1, wherein the processing circuitry is configured to generate the display image respectively as a display image for a left eye and a display image for a right eye.

13. The image processing apparatus according to claim 12, wherein the processing circuitry is configured to:
track the eyeball in the operative field image for one or both of the left eye and the right eye,
change the position or the size of the boundary on the basis of the tracking result of the eyeball for one or both of the left eye and the right eye, and
generate the display image for the left eye and the display image for the right eye.

14. The image processing apparatus according to claim 12, wherein the processing circuitry is configured to set the boundary at the same position in the display image for the left eye and the display image for the right eye.

15. The image processing apparatus according to claim 12, wherein the processing circuitry is configured to set the boundary at a different position in the display image for the left eye and the display image for the right eye.

16. The image processing apparatus according to claim 15, wherein the processing circuitry is configured to set the boundary at a different position to indicate one specific position in the display image for the left eye and the display image for the right eye.

17. The image processing apparatus according to claim 12, wherein the processing circuitry is configured to:
shift the display image for the left eye and the display image for the right eye on the basis of depth information of desired localization of a three-dimensional image including the display image for the left eye and the display image for the right eye, and
generate the three-dimensional image.

18. The image processing apparatus according to claim 1, wherein the processing circuitry is configured to change a display mode of any or all of the plurality of regions according to a tracking status of the eyeball.

19. The image processing apparatus according to claim 1, wherein when the eyeball deviates from the tracking, the processing circuitry is configured to maintain the last display image before the eyeball deviates.

20. The image processing apparatus according to claim 1, wherein the processing circuitry is configured to maintain a display mode of any or all of the plurality of regions according to a time period.

21. The image processing apparatus according to claim 1, wherein the processing circuitry is configured to change a size of any or all of the plurality of regions according to a size change of the eyeball.

22. The image processing apparatus according to claim 1, wherein the processing circuitry is configured to change a size of any or all of the plurality of regions according to a time period.

23. An image processing method comprising:

causing an image processing apparatus to:

receive an operative field image for an eye of a patient;

track an eyeball in the operative field image;

set a plurality of regions of the operative field image, the plurality of regions having different display modes;

generate a display image including the plurality of regions of the operative field image in which an annular or radial boundary formed by the difference in the display modes between the plurality of regions of the operative field image indicates a specific position or a specific size with respect to the eye; and change a position or a size of the boundary on the basis of a tracking result of the eyeball, wherein the display image is generated based upon the changed position or the changed size of the boundary.

24. An operation microscope system comprising:

an operation microscope that obtains an operative field image for an eye of a patient;

an image processing apparatus that generates a display image; and a display device that displays the display image, wherein the image processing apparatus includes processing circuitry configured to:

receive the operative field image;

track an eyeball in the operative field image;

set a plurality of regions of the operative field image, the plurality of regions having different display modes;

generate the display image including the plurality of regions of the operative field image in which an annular or radial boundary formed by the difference in the display modes between the plurality of regions of the operative field image indicates a specific position or a specific size with respect to the eye; and change a position or a size of the boundary on the basis of a tracking result of the eyeball, and the processing circuitry is configured to generate the display image based upon the changed position or the changed size of the boundary.

* * * * *